US012361905B2

(12) United States Patent
Ohira et al.

(10) Patent No.: US 12,361,905 B2
(45) Date of Patent: Jul. 15, 2025

(54) DISPLAY DEVICE

(71) Applicant: Japan Display Inc., Tokyo (JP)

(72) Inventors: Hirofumi Ohira, Tokyo (JP); Koji Yoshida, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/742,041

(22) Filed: Jun. 13, 2024

(65) Prior Publication Data

US 2024/0428749 A1 Dec. 26, 2024

(30) Foreign Application Priority Data

Jun. 20, 2023 (JP) ................................ 2023-100883

(51) Int. Cl.
*G09G 3/36* (2006.01)

(52) U.S. Cl.
CPC ....... *G09G 3/367* (2013.01); *G09G 2320/041* (2013.01); *G09G 2320/0666* (2013.01); *G09G 2320/0673* (2013.01)

(58) Field of Classification Search
CPC .......... G09G 3/20; G09G 3/3225; G09G 3/32; G09G 3/367; G09G 2320/041; G09G 2320/0666; G09G 2320/0673
See application file for complete search history.

(56) References Cited

U.S. PATENT DOCUMENTS

| | | | | |
|---|---|---|---|---|
| 11,804,156 B2 * | 10/2023 | Fujikawa | ............... | G09G 3/002 |
| 2018/0240423 A1 * | 8/2018 | Park | ..................... | G09G 3/3685 |
| 2024/0334794 A1 * | 10/2024 | Hai | ........................ | H10K 59/60 |

FOREIGN PATENT DOCUMENTS

| | | |
|---|---|---|
| JP | 2006-195388 A | 7/2006 |

* cited by examiner

*Primary Examiner* — Michael A Faragalla
(74) *Attorney, Agent, or Firm* — K&L Gates LLP

(57) ABSTRACT

According to an aspect, a display device includes: a display panel having a display region configured to output an image; a light source configured to emit light toward one surface side of the display panel; a liquid crystal panel interposed between the display panel and the light source and provided to be able to change a transmission degree of light between the display panel and the light source; a temperature detector configured to detect temperature of at least one of the display panel and the liquid crystal panel; and a controller configured to adjust color to be reproduced by the display panel in accordance with the temperature detected by the temperature detector.

5 Claims, 18 Drawing Sheets

DISPLAY DEVICE

CROSS-REFERENCE TO RELATED APPLICATION

This application claims the benefit of priority from Japanese Patent Application No. 2023-100883 filed on Jun. 20, 2023, the entire contents of which are incorporated herein by reference.

BACKGROUND

1. Technical Field

What is disclosed herein relates to a display device.

2. Description of the Related Art

In recent display devices, there is a demand to be able to change a range of view angles in which an image can be viewed. For example, a display device mounted on a vehicle such as a four-wheel automobile is desired to achieve a view angle range in which an image can be viewed from the front passenger seat side and the image cannot be viewed from the driver seat side only during driving. To achieve such a view angle range, Japanese Patent Application Laid-open Publication No. 2006-195388 discloses technologies in which a liquid crystal panel for light adjustment with a switchable view angle range is placed over an image display panel.

Liquid crystal has a tendency that response characteristics of liquid crystal molecules to applied voltage change with temperature. Accordingly, the chromaticity of reproduced color in display output tends to change with the temperature of display device, and the quality of display output cannot be stabilized.

For the foregoing reasons, there is a need for a display device capable of reducing change of display output due to temperature change.

SUMMARY

According to an aspect, a display device includes: a display panel having a display region configured to output an image; a light source configured to emit light toward one surface side of the display panel; a liquid crystal panel interposed between the display panel and the light source and provided to be able to change a transmission degree of light between the display panel and the light source; a temperature detector configured to detect temperature of at least one of the display panel and the liquid crystal panel; and a controller configured to adjust color to be reproduced by the display panel in accordance with the temperature detected by the temperature detector.

DETAILED DESCRIPTION

An embodiment of the present disclosure is described below with reference to the drawings. What is disclosed herein is only an example, and any modification that can be easily conceived by those skilled in the art while maintaining the main purpose of the invention are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference sign is applied to the same elements as those already described for the previously mentioned drawings, and detailed explanations may be omitted as appropriate.

Figure 1:
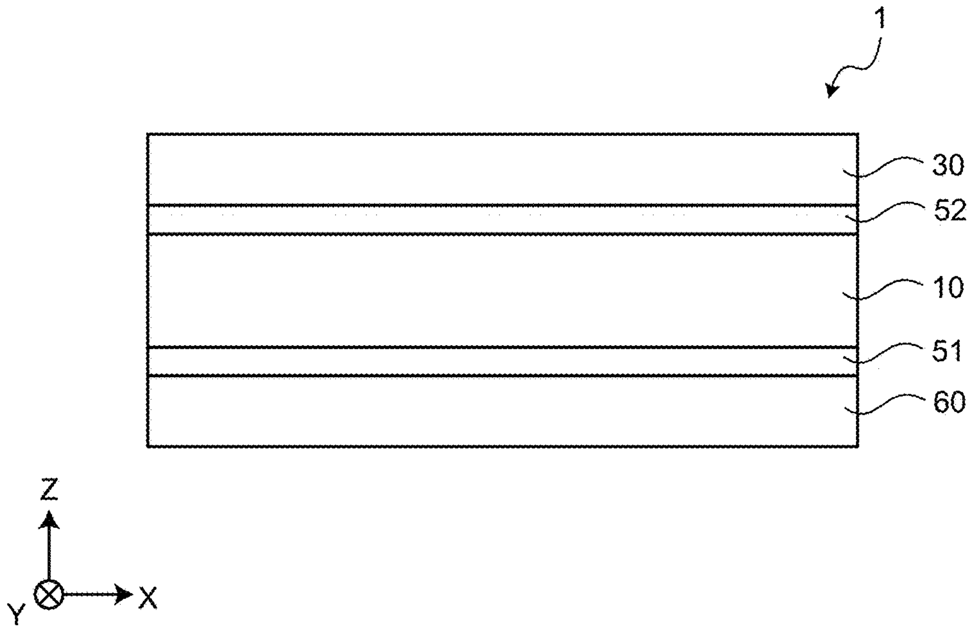
FIG. 1 is a schematic view illustrating an example of a main configuration of a display device according to an embodiment.

FIG. 1 is a schematic view illustrating an example of a main configuration of a display device 1 according to an embodiment. The display device 1 includes a light adjuster 10, a display panel 30, a light source 60, a retardation generation layer 51, and a retardation generation layer 52. A third direction Z is defined to be a direction in which the light adjuster 10, the display panel 30, the light source 60, the retardation generation layer 51, and the retardation generation layer 52 are stacked. A first direction X is defined to be one of two directions orthogonal to the third direction Z, and a second direction Y is defined to be the other direction thereof. The first direction X and the second direction Y are orthogonal to each other. In the display device 1, the light source 60, the retardation generation layer 51, the light adjuster 10, the retardation generation layer 52, and the display panel 30 are stacked in the stated order from one side in the third direction Z toward the other side.

Figure 2:
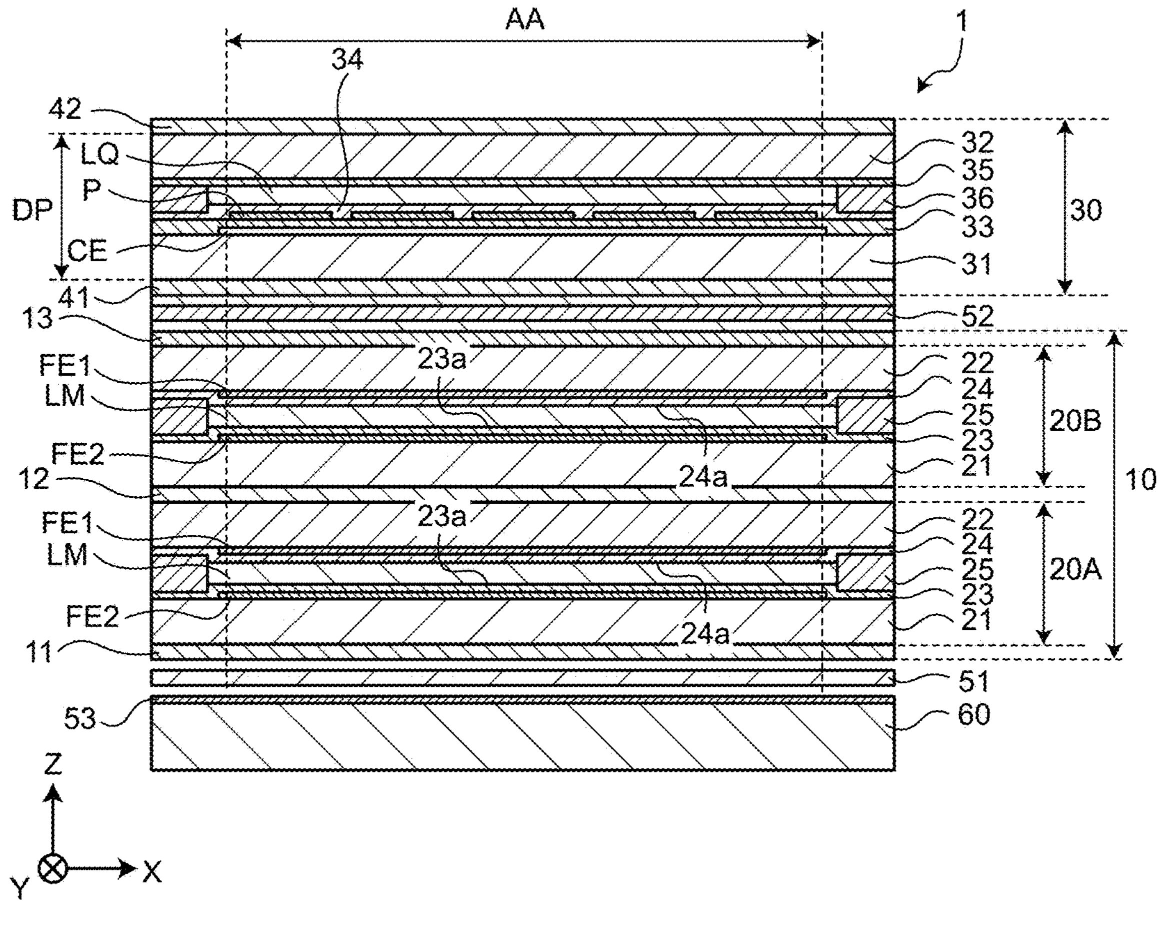
FIG. 2 is a schematic sectional view of components included in the display device.

FIG. 2 is a schematic sectional view of components included in the display device 1. FIG. 2 illustrates gaps provided between the light source 60 and the retardation generation layer 51, between the retardation generation layer 51 and the light adjuster 10, between the light adjuster 10 and the retardation generation layer 52, and between the retardation generation layer 52 and the display panel 30, respectively. The gaps, however, are illustrated to facilitate understanding of the diagram and are unnecessary in the actual display device 1 (refer to FIG. 1).

The light adjuster 10 has a configuration in which a first polarization layer 11, a first liquid crystal panel 20A, a second polarization layer 12, a second liquid crystal panel 20B, and a third polarization layer 13 are stacked from the one side in the third direction Z toward the other side. The first polarization layer 11, the second polarization layer 12, and the third polarization layer 13 as well as a fourth polarization layer 41 and a fifth polarization layer 42 to be described later are each an optical member provided to most transmit light polarized in a specific direction. The specific direction is referred to as a transmission axis direction. The transmission axis direction extends along a polarization plate. Accordingly, the transmission axis direction is orthogonal to the third direction Z. A direction orthogonal to the transmission axis direction and the third direction Z is referred to as an absorption axis direction. The absorption axis direction is a polarization direction in which light is most unlikely to pass through the polarization plate.

The first liquid crystal panel 20A and the second liquid crystal panel 20B are liquid crystal panels. The first liquid crystal panel 20A and the second liquid crystal panel 20B have the same device configuration except that they are provided at different positions.

Hereinafter, the phrase "liquid crystal panel 20" collectively means the first liquid crystal panel 20A and the second liquid crystal panel 20B. Thus, description related to the liquid crystal panel 20 is applicable to both the first liquid crystal panel 20A and the second liquid crystal panel 20B. The liquid crystal panel 20 of the embodiment is a liquid crystal panel of what is called a twisted nematic (TN) type.

The liquid crystal panel 20 has a configuration in which a first substrate 21 is provided on the one side of liquid crystal LM and a second substrate 22 is provided on the other side thereof. The first substrate 21 and the second substrate 22 are light-transmitting substrates. The light-transmitting substrates are, for example, glass substrates but not limited thereto and may be substrates of any other light-transmitting material. Hereinafter, the phrase "one surface" means a surface of a plate-shaped component on the one side in the third direction Z. The phrase "the other surface" means a surface of the plate-shaped component on the other side in the third direction Z.

An electrode FE2 is formed on the other surface of the first substrate 21. An electrode FE1 is formed on one surface of the second substrate 22. The electrodes FE2 and FE1 are electrodes provided to cover a display region AA. The other surface of the electrode FE2 and the other surface of the first substrate 21 in an area where the electrode FE2 is not formed are covered by an insulating layer 23. One surface of the electrode FE1 and the one surface of the second substrate 22 in an area where the electrode FE1 is not formed are covered by an insulating layer 24. The display region AA will be described later.

At least one of the electrodes FE2 and FE1 is provided so that its potential can be changed in accordance with ON and OFF of operation of the liquid crystal panel 20. In other words, voltage generated between the electrodes FE2 and FE1 is different between a case where the liquid crystal panel 20 is in operation (ON) and a case where the liquid crystal panel 20 is not in operation (OFF).

The liquid crystal LM is interposed at least in the display region AA between the insulating layer 23 and the insulating layer 24. A seal 25 is interposed between the insulating layer 23 and the insulating layer 24 outside the display region AA. Although not illustrated, the seal 25 is a frame-shaped member enclosing the liquid crystal LM when viewed at a viewpoint of viewing a plane (X-Y plane) orthogonal to the third direction Z from the front. The liquid crystal LM is surrounded by the seal 25 between the insulating layer 23 and the insulating layer 24, and thus, enclosed in the liquid crystal panel 20.

An alignment film 23*a* is provided on the other surface of the insulating layer 23 at least in an area where the display region AA is covered. An alignment film 24*a* is provided on one surface of the insulating layer 24 at least in an area where the display region AA is covered. The alignment films 23*a* and 24*a* align the orientation of each liquid crystal molecule contained in the liquid crystal LM with a particular direction. The orientation of each liquid crystal molecule changes as the potential difference between the electrodes FE2 and FE1 changes.

The display panel 30 is a liquid crystal panel different from the liquid crystal panel 20. The display panel 30 includes a plurality of pixels. The display panel 30 is an image-display liquid crystal panel provided to be able to individually control the transmission degree of light at the position of each pixel in accordance with image data input from the outside.

The display panel 30 illustrated in FIG. 2 is a liquid crystal panel of what is called an in-plane switching (IPS) type. In the display panel 30, a pixel substrate 31 is provided on one side of liquid crystal LQ in the third direction Z, and a counter substrate 32 is provided on the other side thereof. The fourth polarization layer 41 is provided on one surface side of the pixel substrate 31. The fifth polarization layer 42 is provided on the other surface side of the counter substrate 32. Hereinafter, the phrase "panel DP" means part of the configuration of the display panel 30 other than the fourth polarization layer 41 and the fifth polarization layer 42.

For example, a common electrode CE, an insulating layer 33, pixel electrodes P, and an insulating layer 34 are stacked on the other surface of the pixel substrate 31 from the one side in the third direction Z toward the other side. For example, a color filter 35 is stacked on one surface of the counter substrate 32. A seal 36 is interposed between the insulating layer 34 and the color filter 35 outside the display region AA. The seal 36 has the same shape as the seal 25 described above. The liquid crystal LQ is surrounded by the seal 36 between the insulating layer 34 and the color filter 35, and thus, enclosed in the display panel 30.

The display region AA is a region in which a plurality of pixel electrodes P are disposed in the display panel 30. The pixel electrodes P are two-dimensionally arranged along an X-Y plane in the display region AA. The display panel 30 is a display panel of what is called an active matrix type, which is provided to be able to display and output any desired image by individually controlling the transmission degree of light at each pixel electrode P. More specifically, in the display panel 30 of the embodiment, potential as a reference is provided to the common electrode CE. Individual potentials (pixel signals) are provided to the pixel electrodes P, and accordingly, the transmission degrees of light at the pixel electrodes P are individually controlled. Thus, the display region AA is a region in which an image is displayed and output.

The retardation generation layers 51 and 52 are optical members each of which causes the optical retardation of light entering from the one side in the third direction Z and transmit the light to the other side in the third direction Z. The retardation generation layers 51 and 52 of the embodiment are what is called ½ wave plates.

The light source 60 emits light toward the other surface side where a polarization generation layer 53 is provided. The polarization generation layer 53 is an optical member that converts light emitted from the other surface of the light source 60 into polarized light at a specific angle. The polarization generation layer 53 is, for example, a dual brightness enhancement film (DBEF) but not limited thereto and only needs to be a component that can convert light emitted from the other surface of the light source 60 into polarized light at the specific angle. Light emitted by the light source 60 is exited from the other surface side of the display device 1 through the polarization generation layer 53, the light adjuster 10, the fourth polarization layer 41, the display panel 30, and the fifth polarization layer 42.

Figure 3:
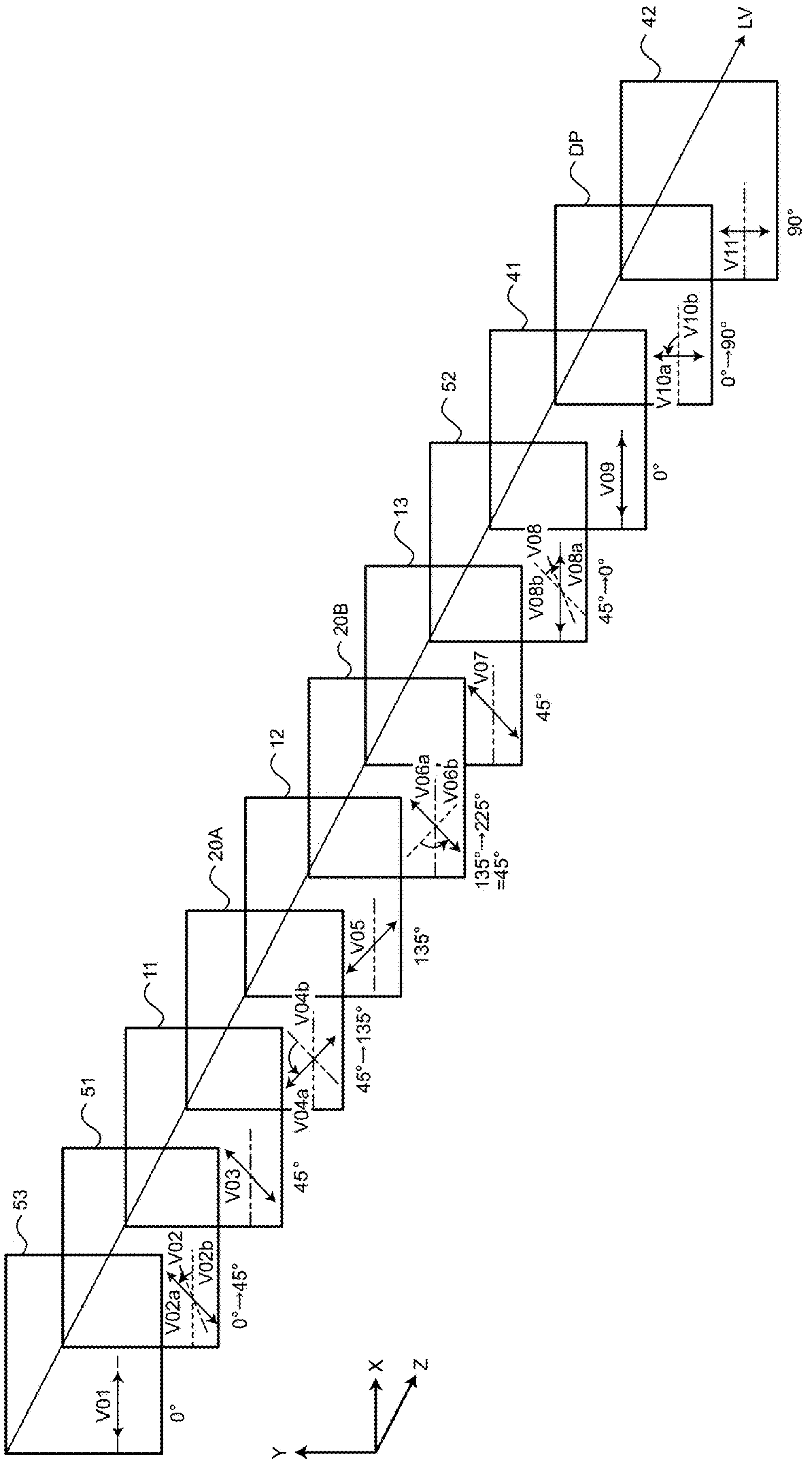
FIG. 3 is a diagram illustrating changes in the polarization direction of light from when light is emitted by a light source to when the light is exited from the other surface side of the display device.

The following describes changes in the polarization direction of light from when light is emitted by the light source 60 to when the light is exited from the other surface side of the display device 1, with reference to FIG. 3.

FIG. 3 is a diagram illustrating changes in the polarization direction of light from when light is emitted by the light source 60 to when the light is exited from the other surface side of the display device 1. In the following description, polarized light in the first direction X is defined as polarized light at 0°. In description with reference to FIG. 3, the angle of polarization is expressed in a minor angle smaller than 180° with respect to the polarized light at 0°. Also in description with reference to FIG. 3, of the changes in the polarization direction of light, a change with anticlockwise rotation by r° along an X-Y plane is referred to as a "change of +r° ", and a change with opposite (clockwise) rotation by r° is referred to as a "change of −r°". The variable r is a real number equal to or larger than zero.

In the embodiment, a polarization axis direction V01 of the polarization generation layer 53 is set so that light emitted from the other surface of the light source 60 is converted into polarized light at 0° and transmitted. Thus, polarized light having passed through the polarization generation layer 53 and incident on the retardation generation layer 51 is polarized light at 0°.

The retardation generation layer 51 is a ½ wave plate as described above. The retardation generation layer 51 of the embodiment causes change in the anticlockwise (+) direction. A slow axis direction V02 of the retardation generation layer 51 is set so as to be at +22.5° relative to the polarized light) (0° passing through the polarization generation layer 53. Accordingly, polarized light undergoes a change of +45° while passing through the retardation generation layer 51. Thus, polarized light having passed through the retardation generation layer 51 and incident on the first polarization layer 11 is polarized light at 45°. FIG. 3 illustrates an angle V02*b* of the polarized light incident on the retardation generation layer 51 and an angle V02*a* of the polarized light having passed through the retardation generation layer 51.

A transmission axis direction V03 of the first polarization layer 11 is set to allow maximum transmission of polarized light at 45°. Thus, light having passed through the retardation generation layer 51 can pass through the first polarization layer 11. Polarized light having passed through the first polarization layer 11 and incident on the first liquid crystal panel 20A is polarized light at 45°.

The liquid crystal panel 20 is provided to apply a change of +90° to polarized light passing therethrough from the one side in the third direction Z to the other side. In other words, the polarized light undergoes the change of +90° while passing through the first liquid crystal panel 20A. Thus, polarized light having passed through the first liquid crystal panel 20A and incident on the second polarization layer 12 is polarized light at 135°. FIG. 3 illustrates an angle V04*b* of polarized light incident on the first liquid crystal panel 20A and an angle V04*a* of polarized light having passed through the first liquid crystal panel 20A.

A transmission axis direction V05 of the second polarization layer 12 is set to allow maximum transmission of polarized light at 135°. Thus, light having passed through the first liquid crystal panel 20A can pass through the second polarization layer 12. Polarized light having passed through the second polarization layer 12 and incident on the second liquid crystal panel 20B is polarized light at 135°.

Polarized light undergoes the change of +90° while passing through the second liquid crystal panel 20B. Thus, polarized light having passed through the second liquid crystal panel 20B and incident on the third polarization layer 13 is polarized light at 225°, which is the same as polarized light at 45°. FIG. 3 illustrates an angle V06*b* of polarized light incident on the second liquid crystal panel 20B and an angle V06*a* of polarized light having passed through the second liquid crystal panel 20B.

A transmission axis direction V07 of the third polarization layer 13 is set to allow maximum transmission of polarized light at 45°. Thus, light having passed through the second liquid crystal panel 20B can pass through the third polarization layer 13. Polarized light having passed through the third polarization layer 13 and incident on the retardation generation layer 52 is polarized light at 45°.

The retardation generation layer 52 is a ½ wave plate as described above. The retardation generation layer 52 of the embodiment causes a change in the clockwise (−) direction. A slow axis direction V08 of the retardation generation layer 52 is set so as to be at −22.5° relative to polarized light) (45° passing through the polarization generation layer 53. Accordingly, polarized light undergoes a change of −45° while passing through the retardation generation layer 52. Thus, polarized light having passed through the retardation generation layer 52 and incident on the fourth polarization layer 41 is polarized light at 0°. FIG. 3 illustrates an angle V08*b* of polarized light incident on the retardation generation layer 52 and an angle V08*a* of polarized light having passed through the retardation generation layer 52.

A transmission axis direction V09 of the fourth polarization layer 41 is set to allow maximum transmission of polarized light at 0°. Thus, light having passed through the retardation generation layer 52 can pass through the fourth polarization layer 41. Polarized light having passed through the fourth polarization layer 41 and incident on the panel DP is polarized light at 0°.

The panel DP is provided to apply a change of +90° to polarized light passing therethrough from the one side in the third direction Z to the other side. In other words, polarized light undergoes the change of +90° while passing through the panel DP. Thus, polarized light having passed through the panel DP and incident on the fifth polarization layer 42 is polarized light at 90°. FIG. 3 illustrates an angle V10*b* of polarized light incident on the panel DP and an angle V10*a* of polarized light having passed through the panel DP.

A transmission axis direction V11 of the fifth polarization layer 42 is set to allow maximum transmission of polarized light at 90°. Thus, light having passed through the panel DP can pass through the fifth polarization layer 42. In this manner, a transmission path LV of light from the light source 60 to the other surface side of the fifth polarization layer 42 is formed.

The liquid crystal panel 20 will be more specifically described below with reference to FIGS. 4 to 7.

Figure 4:
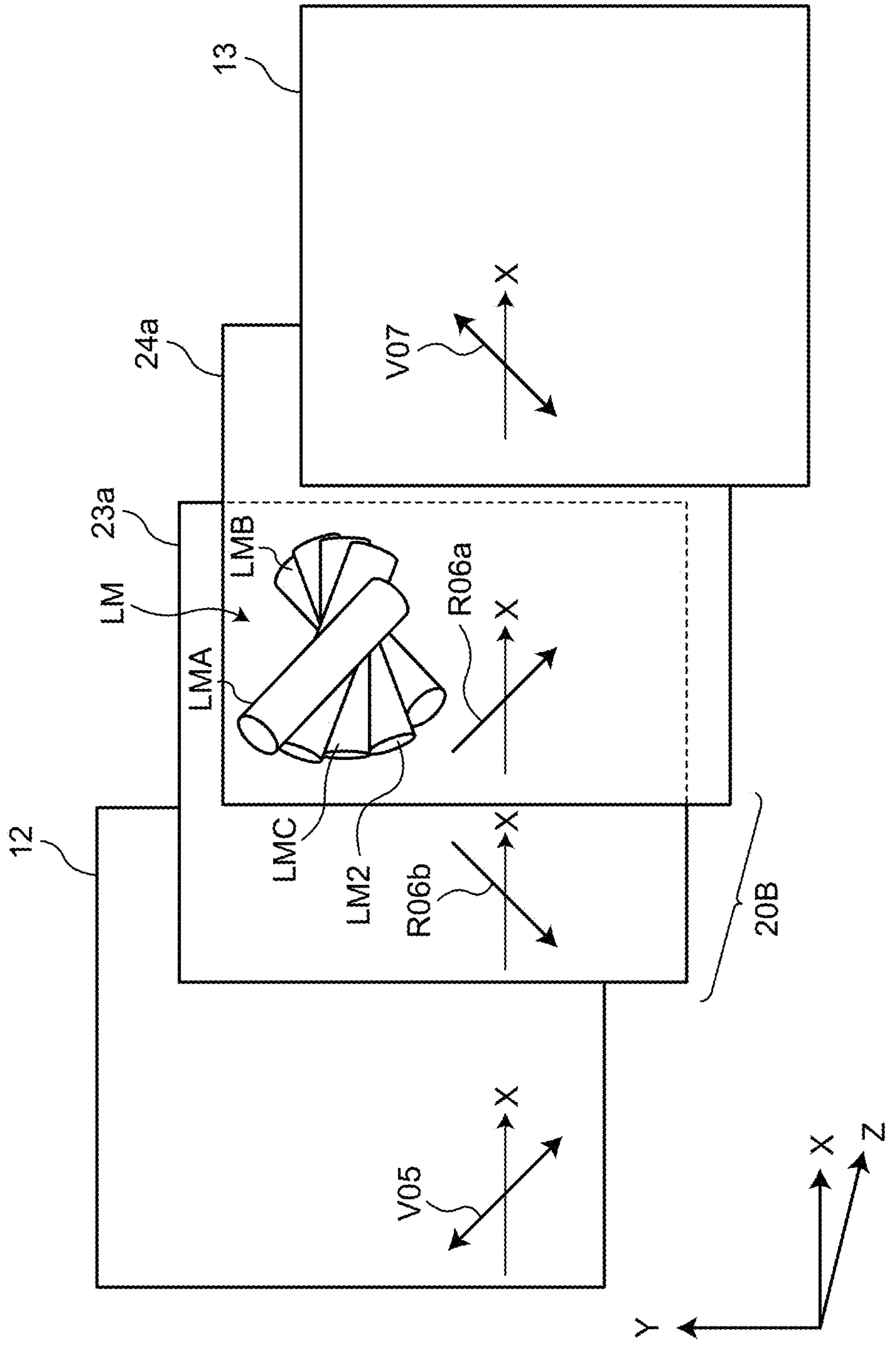
FIG. 4 is a diagram illustrating the relation of rubbing directions R06*a* and R06*b* of respective alignment films included in a second liquid crystal panel with transmission axis directions of a second polarization layer and a third polarization layer disposed facing in a third direction with the second liquid crystal panel interposed therebetween.

FIG. 4 is a diagram illustrating the relation of rubbing directions R06*a* and R06*b* of the respective alignment films 23*a* and 24*a* included in the second liquid crystal panel 20B with the transmission axis directions of the second polarization layer 12 and the third polarization layer 13 disposed facing each other in the third direction Z with the second liquid crystal panel 20B interposed therebetween. In description with reference to FIG. 4 and FIG. 7 to be described later, a direction toward one side in the first direction X (the right side in FIG. 4) is defined as a direction at 0°. A direction having an angle formed anticlockwise relative to the direction at 0° is defined as a direction at a positive (+) angle) (°), and a direction having an angle formed clockwise is defined as a direction at a negative (−) angle) (°).

The alignment films 23*a* and 24*a* are each provided with rubbing treatment on a contacting surface side with the liquid crystal LM to align the orientation of each liquid crystal molecule with a particular direction. The particular direction provided by the rubbing treatment is a rubbing direction. The rubbing direction R06*b* of the alignment film 23*a* is at) 225° (−135°. The rubbing direction R06*a* of the alignment film 24*a* is at) 315° (−45°.

The alignment film 23*a* is stacked on the other surface of the first substrate 21 in the second liquid crystal panel 20B, and the second polarization layer 12 faces one surface of the first substrate 21. As illustrated in FIGS. 3 and 4, a transmission axis direction V05 of the second polarization layer 12 is at 135°. Accordingly, the rubbing direction R06*b* of the alignment film 23*a* and the transmission axis direction V05 of the second polarization layer 12 are orthogonal to each other.

The alignment film 24*a* is stacked on one surface of the second substrate 22 in the second liquid crystal panel 20B, and the third polarization layer 13 faces the other surface of the second substrate 22. As illustrated in FIGS. 3 and 4, a transmission axis direction V07 of the third polarization layer 13 is at 45°. Accordingly, the rubbing direction R06*a* of the alignment film 24*a* and the transmission axis direction V07 of the third polarization layer 13 are orthogonal to each other.

As described above with reference to FIG. 4, in the second liquid crystal panel 20B of the embodiment, the rubbing direction of an alignment film stacked on a substrate and the orientation axis of a polarization layer contacting the substrate are orthogonal to each other. In other words, the second liquid crystal panel 20B is provided as what is called an O-mode liquid crystal panel.

As described above, the first liquid crystal panel 20A and the second liquid crystal panel 20B have the same configuration of a liquid crystal panel (the liquid crystal panel 20). Accordingly, the rubbing direction R06*b* of the alignment film 23*a* on one surface side of the first liquid crystal panel 20A is at) 225° (−135°) as in the second liquid crystal panel 20B. A transmission axis direction V03 of the first polarization layer 11 disposed on the one surface side of the first liquid crystal panel 20A is at 45°. The rubbing direction R06*a* of the alignment film 24*a* on the other surface side of the first liquid crystal panel 20A is) 315° (−45°) as in the second liquid crystal panel 20B. The transmission axis direction V05 of the second polarization layer 12 disposed on the other surface side of the first liquid crystal panel 20A is at 135°. Accordingly, in the first liquid crystal panel 20A of the embodiment, the rubbing direction of an alignment film stacked on a substrate and the orientation axis of a polarization layer contacting the substrate are parallel to each other. In other words, the first liquid crystal panel 20A is provided as what is called an E-mode liquid crystal panel.

More specifically, the shape of each liquid crystal molecule contained in the liquid crystal LM can be regarded as a prolate spheroid. The long axis direction of the prolate spheroid is defined as an "ne ($n_{extraordinary}$) axis". The short axis direction of the prolate spheroid orthogonal to the ne axis is defined as an "no ($n_{ordinary}$) axis". In the E mode, the rubbing direction of the alignment film 23*a* is set so that the transmission axis direction of the polarization layer facing the alignment film 23*a* with the first substrate 21 interposed therebetween is aligned with the ne axis, and the rubbing direction of the alignment film 24*a* is set so that the transmission axis direction of the polarization layer facing the alignment film 24*a* with the second substrate 22 interposed therebetween is aligned with the ne axis. In the O mode, the rubbing direction of the alignment film 23*a* is set so that the transmission axis direction of the polarization layer facing the alignment film 23*a* with the first substrate 21 interposed therebetween is aligned with the no axis, and the rubbing direction of the alignment film 24*a* is set so that the transmission axis direction of the polarization layer facing the alignment film 24*a* with the second substrate 22 interposed therebetween is aligned with the no axis.

A rubbing direction does not limit polarized light passing therethrough. In other words, the alignment films 23*a* and 24*a* transmit light irrespective of their rubbing directions.

Figure 5:
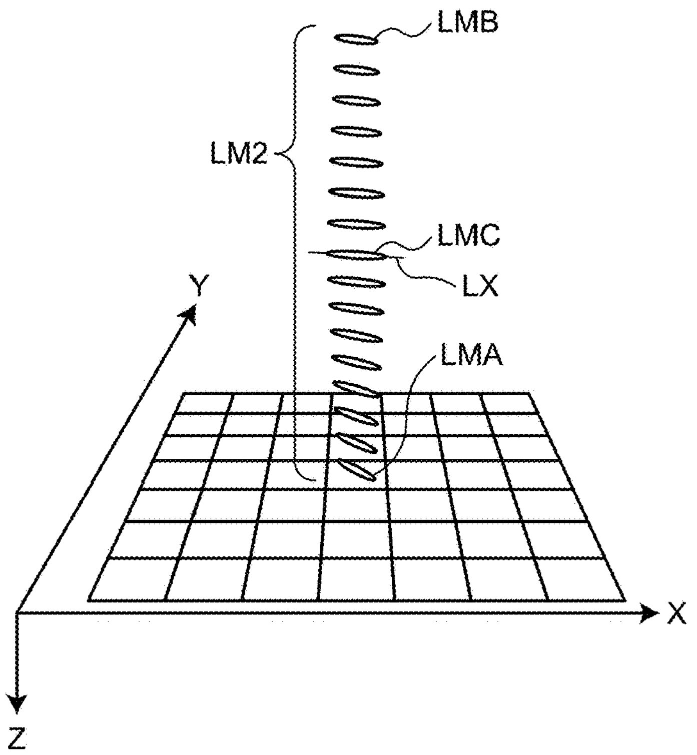
FIG. 5 is a diagram illustrating the orientations of liquid crystal molecules when a liquid crystal panel is not in operation (OFF)
Figure 6:
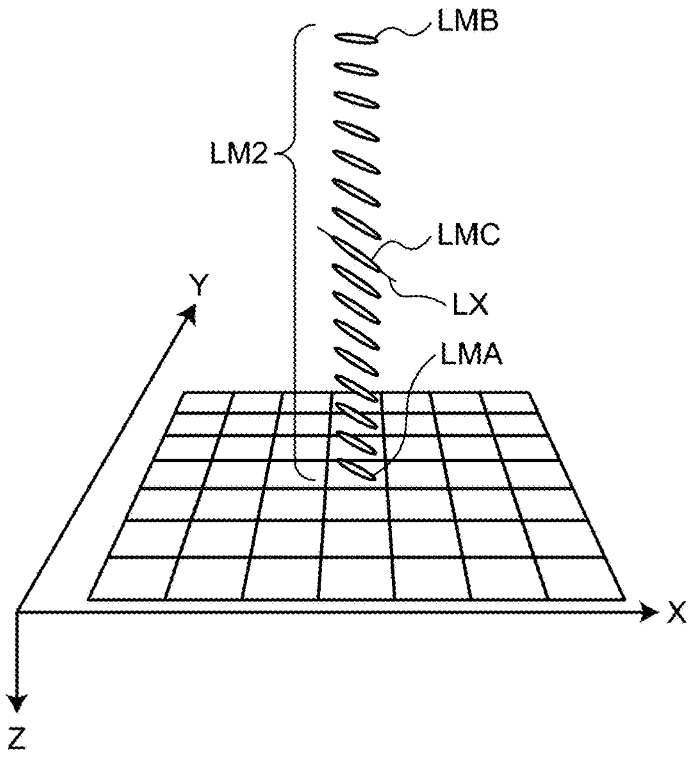
FIG. 6 is a diagram illustrating the orientations of liquid crystal molecules when a liquid crystal panel is in operation (ON)

The rubbing directions of the alignment films 23*a* and 24*a* affect the orientations of liquid crystal molecules contained in the liquid crystal LM. In FIG. 4 and FIGS. 5 and 6 to be described later, liquid crystal molecules LM2 are illustrated as liquid crystal molecules contained in the liquid crystal LM. Among the liquid crystal molecules LM2, a liquid crystal molecule positioned on the alignment film 23*a* side and oriented in the rubbing direction R06*b* is specially illustrated as a liquid crystal molecule LMB. Among the liquid crystal molecules LM2, a liquid crystal molecule positioned on the alignment film 24*a* side and oriented in the rubbing direction R06*a* is specially illustrated as a liquid crystal molecule LMA. Among the liquid crystal molecules LM2, a liquid crystal molecule at an approximately intermediate position between the liquid crystal molecule LMA and the liquid crystal molecule LMB in the third direction Z is specially illustrated as a liquid crystal molecule LMC.

As illustrated in FIG. 4, among the liquid crystal molecules LM2, those closer to the alignment film 23*a* are oriented in directions closer to the rubbing direction R06*b*, and those closer to the alignment film 24*a* are oriented in directions closer to the rubbing direction R06*a* when viewed at a viewpoint of viewing an X-Y plane from the front. With such continuity of change in liquid crystal molecule orientation across the liquid crystal molecules LM2 arranged in the third direction z, the liquid crystal panel 20 applies the change of +90° to polarized light passing therethrough from the one side in the third direction Z to the other side.

FIG. 5 is a diagram illustrating the orientations of the liquid crystal molecules LM2 when the liquid crystal panel 20 is not in operation (OFF). FIG. 6 is a diagram illustrating the orientations of the liquid crystal molecules LM2 when the liquid crystal panel 20 is in operation (ON). As described above, the liquid crystal panel 20 is a liquid crystal panel of the TN type. Accordingly, when the liquid crystal panel 20 is not in operation (OFF), a long axis direction LX of each liquid crystal molecule LM2 is substantially aligned with an X-Y plane as illustrated in FIG. 5. When the liquid crystal panel 20 is in operation (ON), the orientation of each liquid crystal molecule LM2 changes in accordance with the potential difference between the electrodes FE2 and FE1 (refer to FIG. 2) so that the long axis direction LX is closer to the third direction Z. Accordingly, when the liquid crystal panel 20 is in operation (ON), the long axis direction LX of each liquid crystal molecule LM2 intersects an X-Y plane as illustrated in FIG. 6.

When the liquid crystal panel 20 is not in operation (OFF) as described above with reference to FIG. 5, the transmission degree of light on one side in the first direction X is hardly different from that on the other side in the first direction X. Specifically, when the first liquid crystal panel 20A and the second liquid crystal panel 20B are both not in operation (OFF) and an image DSP (refer to FIG. 9) on the display device 1 is viewed from each of two viewpoints that are line symmetric in the first direction X with respect to a viewpoint of viewing the display device 1 from the front, the brightnesses of the image recognized at the two viewpoints are substantially equal to each other. Hereinafter, the phrase "image DSP" means an image displayed and output by the display panel 30 of the display device 1. In this case, at a viewpoint of viewing the display device 1 from the front, the image can be viewed with a brightness equal to or higher than brightnesses at other viewpoints. In other words, when the liquid crystal panel 20 is not in operation (OFF), the transmission degree of light along the third direction Z through the liquid crystal panel 20 is equal to or larger than the transmission degree of light intersecting the third direction Z through the liquid crystal panel 20.

When the liquid crystal panel 20 is in operation (ON) as described above with reference to FIG. 6, the transmission degree of light on the one side in the first direction X is different from that on the other side in the first direction X. The following describes a view angle characteristic of the display device 1, which is obtained in accordance with the transmission degree of light when the liquid crystal panel 20 is in operation (ON), with reference to FIG. 7.

Figure 7:
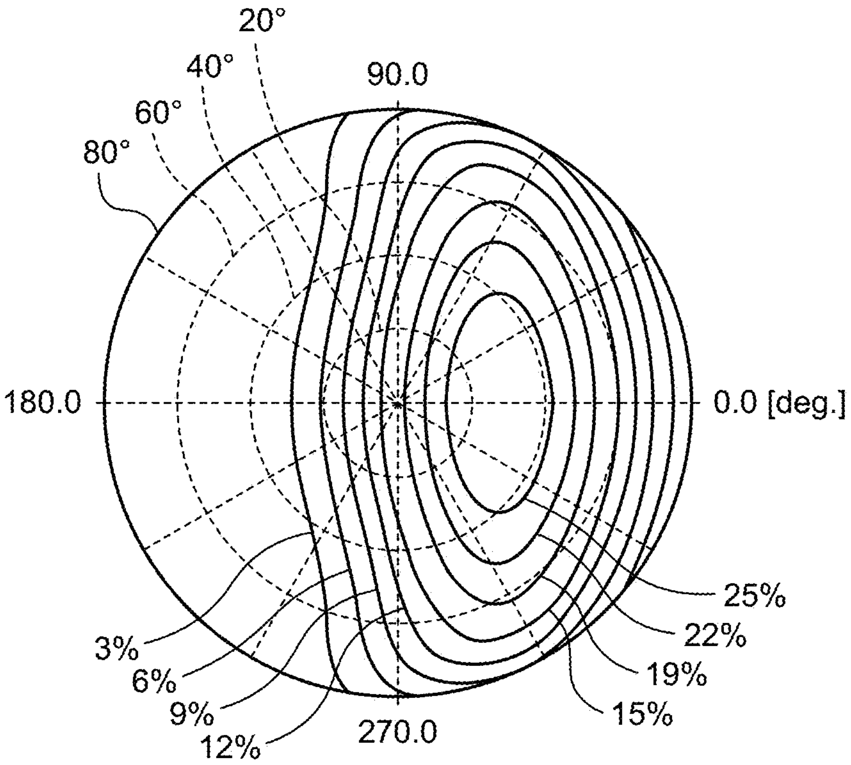
FIG. 7 is a diagram illustrating an exemplary view angle characteristic of the display device that is obtained in accordance with the transmission degree of light when a liquid crystal panel is in operation (ON)

FIG. 7 is a diagram illustrating an exemplary view angle characteristic of the display device 1, which is obtained in accordance with the transmission degree of light when the liquid crystal panel 20 is in operation (ON). The center of concentric circles in FIG. 7 corresponds to the normal of the display device 1 in the third direction Z, and the concentric circles centered at the normal indicate tilt angles of 20°, 40°, 60°, and 80°, respectively, with respect to the normal. This illustrated characteristic diagram is obtained by connecting regions of transmittances in respective directions that are equal to each other.

As illustrated in FIG. 7, relatively high transmittance of light is obtained when user's line of sight toward the display device 1 is tilted toward one side) (0°) in the first direction X. Relatively high transmittance of light is also obtained when user's line of sight toward the display device 1 is aligned with the normal direction, in other words, when the user views the display device 1 from the front. However, when user's line of sight toward the display device 1 is tilted toward the other side) (180°) in the first direction X, the transmittance of light significantly decreases as compared to the case of tilt toward the one side. In particular, when the tilt angle of the line of sight toward the other side) (180°) in the first direction X exceeds 30°, the transmittance is 3% or lower in the example illustrated in FIG. 7 and the brightness is so low that the image substantially cannot be viewed by a human.

The view angle characteristic described above with reference to FIG. 7 can be utilized for display output control intended to enable a user viewing the display device 1 from the front or viewing the display device 1 from the one side in the first direction X to view the image but not to enable a user viewing the display device 1 from the other side in the first direction X to view the image. An example in which such a display output control is applied will be described below with reference to FIG. 8.

Figure 8:
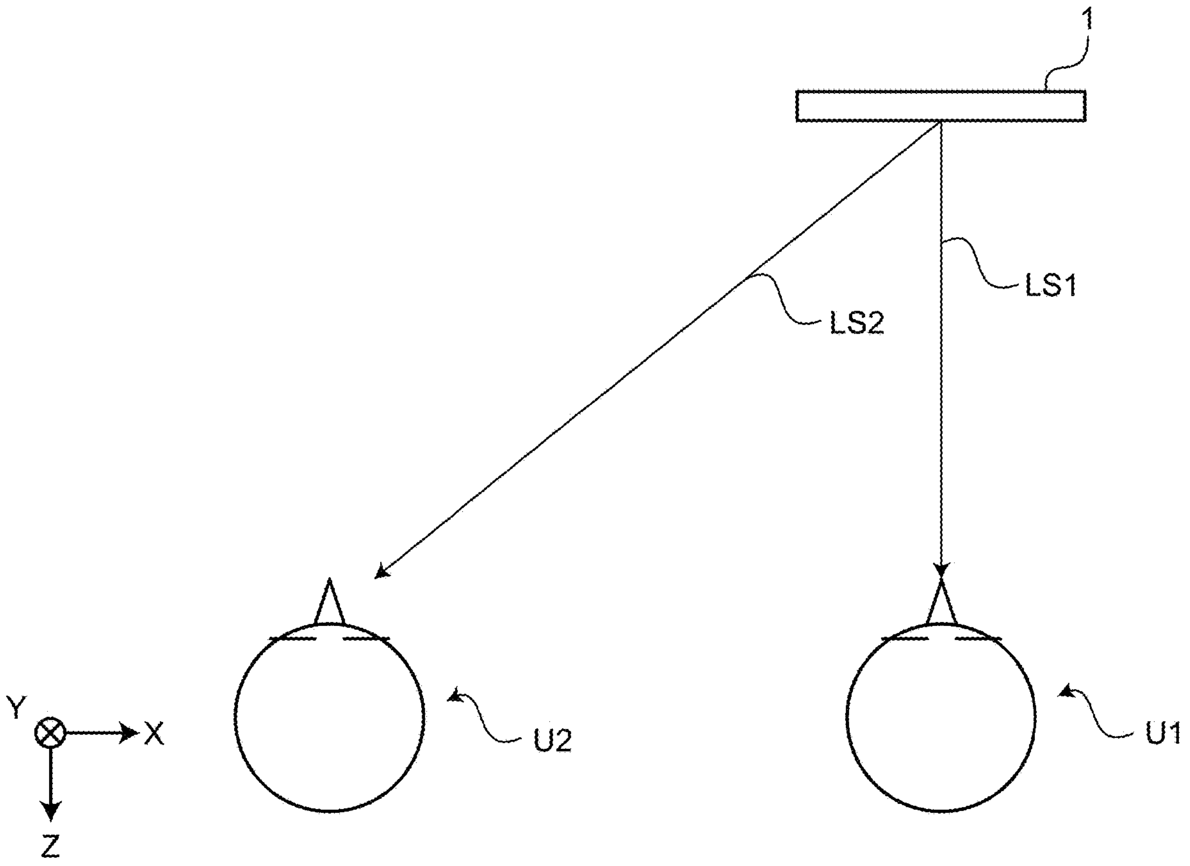
FIG. 8 is a schematic diagram illustrating an example of the relation between the display device, a user who can view an image regardless of whether each liquid crystal panel is in operation or not in operation (ON or OFF), and a user who cannot view the image when each liquid crystal panel is in operation (ON)

FIG. 8 is a schematic diagram illustrating an example of the relation between the display device 1, a user U1 who can view the image DSP regardless of whether each liquid crystal panel 20 is in operation or not in operation (ON or OFF), and a user U2 who cannot view the image DSP when each liquid crystal panel 20 is in operation (ON).

As illustrated in FIG. 8, the display device 1 and the user U1 face each other in the third direction Z. Although not illustrated in FIG. 8, the other surface side of the display device 1, in other words, the fifth polarization layer 42 side is the user U1 side in FIG. 8. Thus, in display output by the display device 1, light LS1 of the image toward the user U1 is along the third direction Z. In such a positional relation the display device 1 and the user U1, it can be expressed that the user U1 is located at a viewpoint of viewing the display device 1 from the front. The user U2 is located at a position of obliquely viewing the other surface side of the display device 1 in a direction tilted toward the other side in the first direction X relative to the third direction Z. In other words, in display output by the display device 1, light LS2 of the image toward the user U2 is tilted toward the other side (180°) in FIG. 7) in the first direction X. In such a positional relation the display device 1 and the user U2, it can be expressed that the user U2 is located at a viewpoint of obliquely viewing the display device 1.

A case where the positional relation between the display device 1 and the users U1 and U2 as illustrated in FIG. 8 is established is, for example, a case where the display device 1 is provided in a four-wheel automobile in which the user U2 is seated on the driver seat and the user U1 is seated on the front passenger seat, but is not limited thereto. The positional relation can be established, for example, in a case where the display device 1 is provided as a personal monitor for each passenger on an aircraft such as a passenger airplane, and any other case may be included.

Figure 9:
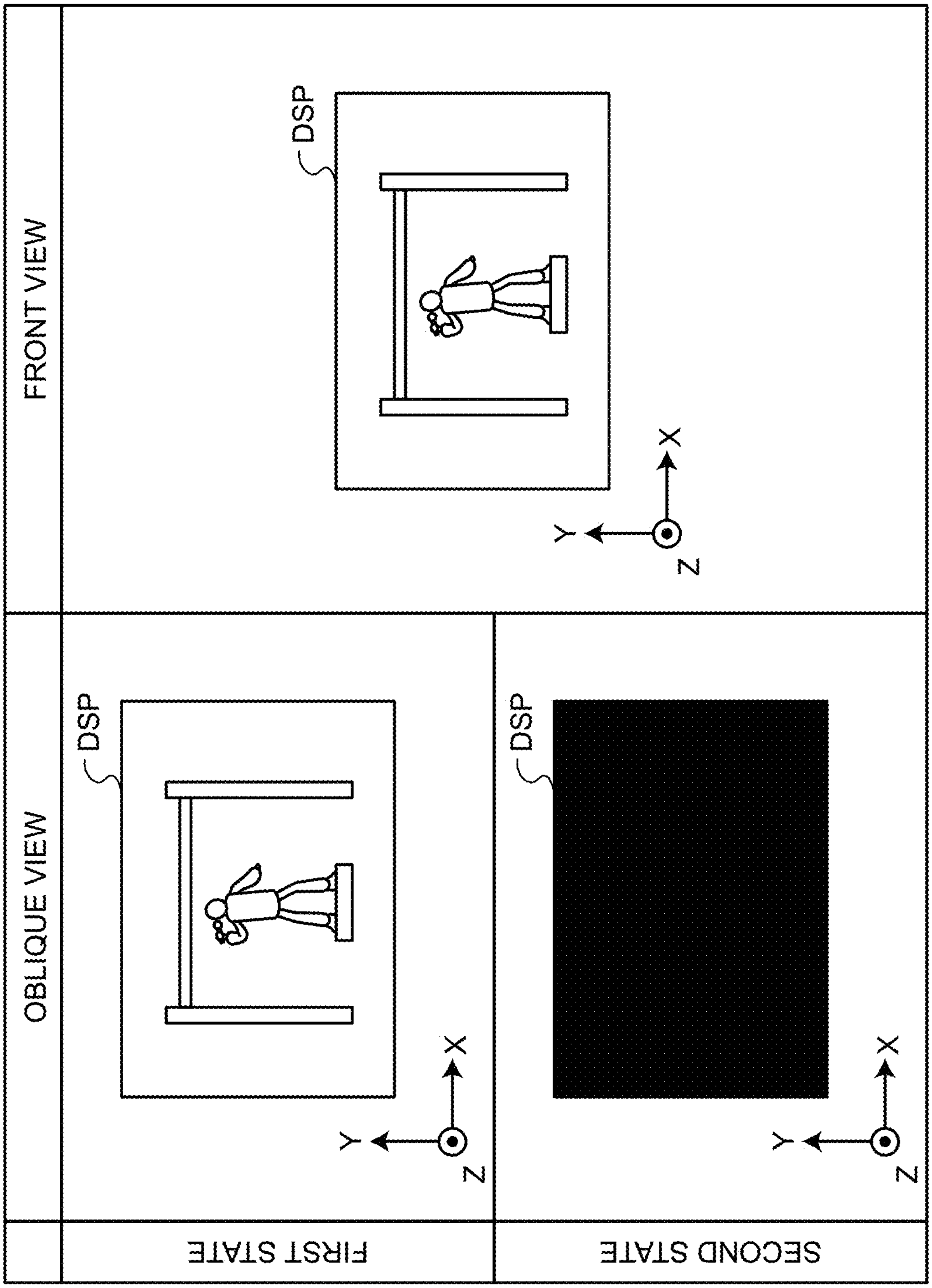
FIG. 9 is a schematic view illustrating a difference in the images viewed by a user viewing the display device from the front and a user obliquely viewing the display device.

FIG. 9 is a schematic view illustrating a difference in the images DSP viewed by a user viewing the display device 1 from the front and a user obliquely viewing the display device 1. The user viewing the display device 1 from the front is, for example, the user U1 in FIG. 8. The user obliquely views the display device 1 is, for example, the user U2 in FIG. 8. In description with reference to FIG. 9, a state of the display device 1 in which the display panel 30 performs the image display and the liquid crystal panel 20 is not in operation (OFF) is referred to as a first state. A state of the display device 1 in which the display panel 30 performs the image display and the liquid crystal panel 20 is in operation (ON) is referred to as a second state.

As described above, a degree that light along the third direction Z passes through the liquid crystal panel 20 when the liquid crystal panel 20 is not in operation (OFF) is equal to or larger than a degree that light intersecting the third direction Z passes through the liquid crystal panel 20. As described above with reference to FIG. 7, when a user views the display device 1 from the front, relatively high transmittance of light is obtained even while the liquid crystal panel 20 is in operation (ON). Thus, a user viewing the display device 1 from the front can view the image DSP illustrated in FIG. 9 irrespective of whether the operation state of the display device 1 is the first state or the second state. The aspect of the image DSP illustrated in FIG. 9 is merely exemplary and the present disclosure is not limited thereto. The display panel 30 may display and output any desired image.

As described above with reference to FIG. 7, when user's line of sight toward the display device 1 is tilted toward the other side) (180°) in the first direction X while the liquid crystal panel 20 is in operation (ON), transmittance of light significantly decreases as compared to the case of tilt toward the one side. Thus, a user obliquely viewing the display device 1 from the other side in the first direction X substantially cannot view the image DSP when the operation state of the display device 1 is the second state. However, when the operation state of the display device 1 is the first state, such significant decrease in the transmittance of light as described above with reference to FIG. 7 does not occur even for the other side) (180°) in the first direction X. Thus, when the operation state of the display device 1 is in the first state, a user obliquely viewing the display device 1 from the other side in the first direction X can view substantially the same image DSP as that for a user viewing the display device 1 from the front.

As illustrated in FIG. 9, the image DSP is viewed as a rectangular image. Accordingly, the display region AA has a rectangular shape corresponding to the image DSP illustrated in FIG. 9 when the display device 1 is viewed from the front. Two sides of the four sides of the rectangle extend along the first direction X, and the other two sides extend along the second direction Y. The light adjuster 10 of the embodiment causes the transmission degree of light along a line tilted toward one side in the longitudinal direction of the rectangle (the first direction X) with respect to the third direction Z and the transmission degree of light along a line tilted toward the other side in the longitudinal direction to be different from each other. Accordingly, the light adjuster 10 generates the difference in viewing between the first and second states described above with reference to FIG. 9.

As described above, the light adjuster 10 includes the first liquid crystal panel 20A provided as an E-mode liquid crystal panel and the second liquid crystal panel 20B provided as an O-mode liquid crystal panel. Optical characteristics attributable to mixture of the E-mode liquid crystal panel and the O-mode liquid crystal panel will be described below with reference to FIGS. 10 to 12.

Figure 10:
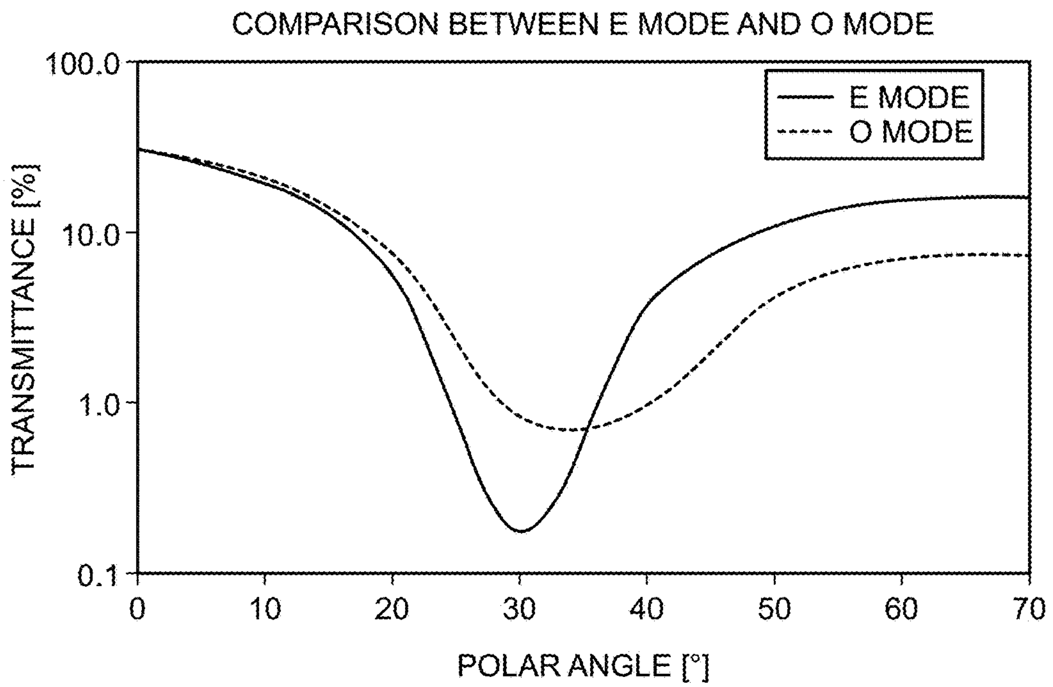
FIG. 10 is a graph illustrating the relation between a polar angle and the transmittance of light when an E-mode or O-mode liquid crystal panel is in operation (ON)

FIG. 10 is a graph illustrating the relation between a polar angle and the transmittance of light when the E-mode or O-mode liquid crystal panel 20 is in operation (ON). The horizontal axis (polar angle) in FIG. 10 and FIG. 14 to be described later represents the angle between the line of light tilted toward the other side in the first direction X (180.0 side in FIG. 7) in the description with reference to FIG. 7 and a reference) (0°) that is an angle aligned with the third direction Z. The vertical axis (transmittance) represents the transmittance of light along a line corresponding to the polar angle represented by the horizontal axis.

As illustrated in FIG. 10, the relation between the polar angle and the transmittance of light when the liquid crystal panel 20 is in operation (ON) is different between the liquid crystal panel 20 (for example, the first liquid crystal panel 20A) provided as an E-mode liquid crystal panel and the liquid crystal panel 20 (for example, the second liquid crystal panel 20B) provided as an O-mode liquid crystal panel. Specifically, the graph illustrating the relation between the polar angle and the transmittance of the liquid crystal panel 20 provided as an E-mode liquid crystal panel has a deep valley shape in which the transmittance significantly decreases to less than 1% with a peak at the polar angle of 30°. However, the graph illustrating the relation between the polar angle and the transmittance of the liquid crystal panel 20 provided as an O-mode liquid crystal panel has a relatively gentle basin shape as compared to the E-mode graph, in which the transmittance is substantially 1% approximately between the polar angle of 30° and the polar angle of 40°.

The difference in optical characteristics between the E and O modes as described above with reference to FIG. 10 can be utilized to achieve a view angle characteristic that is more suitable for prevention of viewing of the image DSP on the display device 1 in the second state from the other side in the first direction X. Specifically, the light adjuster 10 includes one liquid crystal panel 20 (for example, the first liquid crystal panel 20A) provided as an E-mode liquid crystal panel and one liquid crystal panel 20 provided as an O-mode liquid crystal panel (for example, the second liquid crystal panel 20B) as described above with reference to FIGS. 3 and 4. Thus, it is possible to more reliably prevent viewing of the image DSP on the display device 1 in the second state from the other side in the first direction X.

Figure 11:
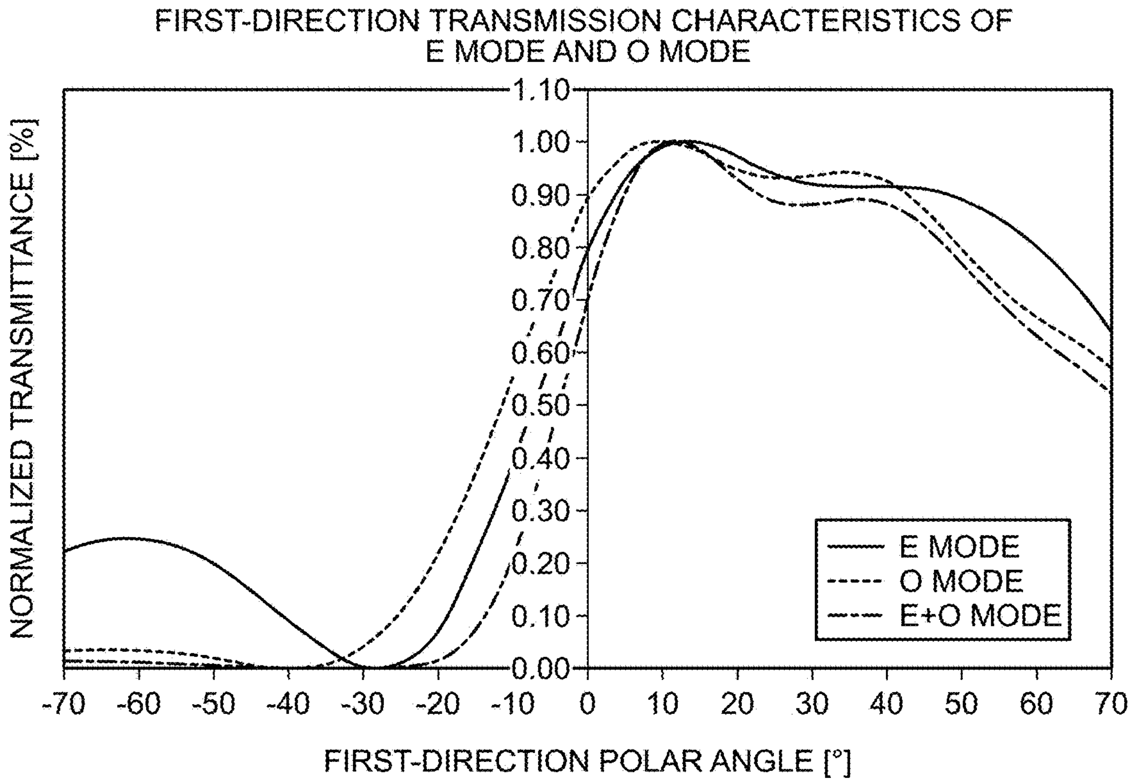
FIG. 11 is a graph illustrating the normalized transmittance of the display device in a second state when the display device includes the E-mode liquid crystal panel only, the O-mode liquid crystal panel only, or a combination of the E-mode liquid crystal panel and the O-mode liquid crystal panel.
Figure 12:
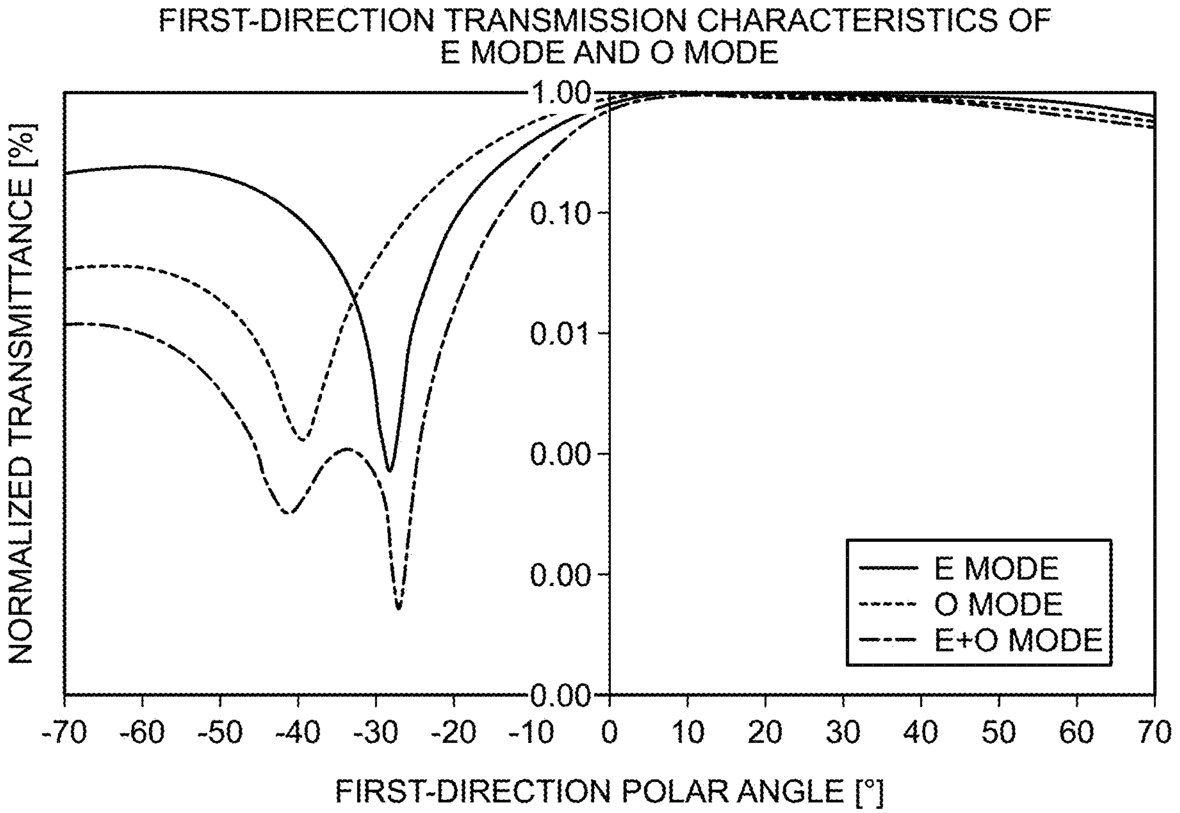
FIG. 12 is a graph illustrating the normalized transmittance of the display device in the second state when the display device includes the E-mode liquid crystal panel only, the O-mode liquid crystal panel only, or the combination of the E-mode liquid crystal panel and the O-mode liquid crystal panel.

FIGS. 11 and 12 are graphs illustrating the normalized transmittance of the display device 1 in the second state when the display device includes the E-mode liquid crystal panel only, the O-mode liquid crystal panel only, or a combination of the E-mode liquid crystal panel and the O-mode liquid crystal panel. “E MODE” illustrates a case of the E-mode liquid crystal panel only, in other words, a configuration in which the light adjuster 10 includes only the E-mode liquid crystal panel. “O MODE” illustrates a case of the O-mode liquid crystal panel only, in other words, a configuration in which the light adjuster 10 includes only the O-mode liquid crystal panel. “E+O MODE” illustrates a case of the combination of the E- and O-mode liquid crystal panels, in other words, a configuration in which the light adjuster 10 includes both the E-mode liquid crystal panel and O-mode liquid crystal panel as in the embodiment.

The normalized transmittance is a value of 0.0 to 1.0, which expresses the brightness of the image DSP that can be viewed by a user. The value of 1.0 is set as the brightness of the image at a view angle at which the image can be viewed brightest when the display device 1 is in operation, and the value of 0.0 is set as the brightness in a state with no light from the light source 60 (when the display device 1 is not in operation).

Figure 15:
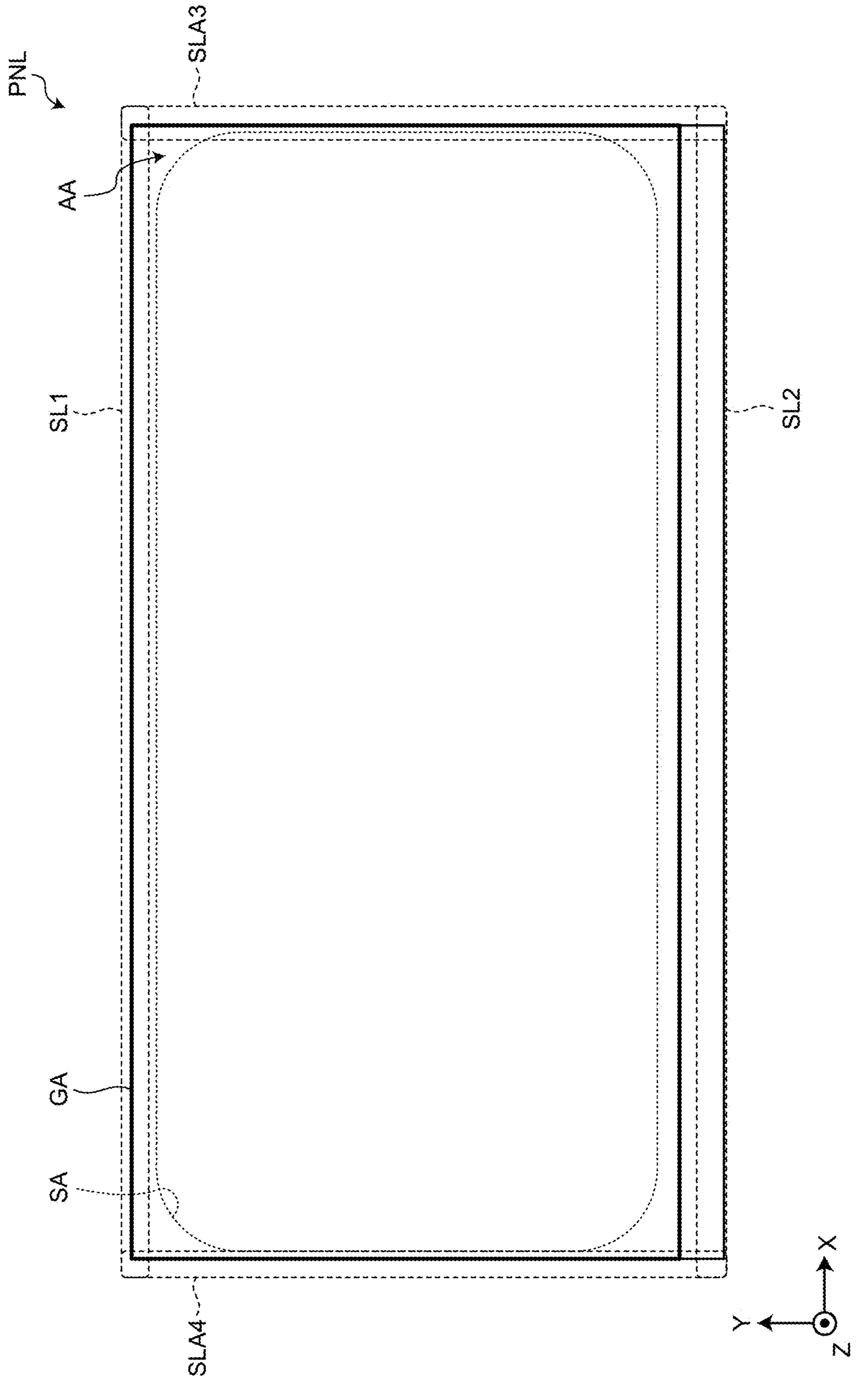
FIG. 15 is a schematic view illustrating the example of the configuration of the temperature detection panel.
Figure 16:
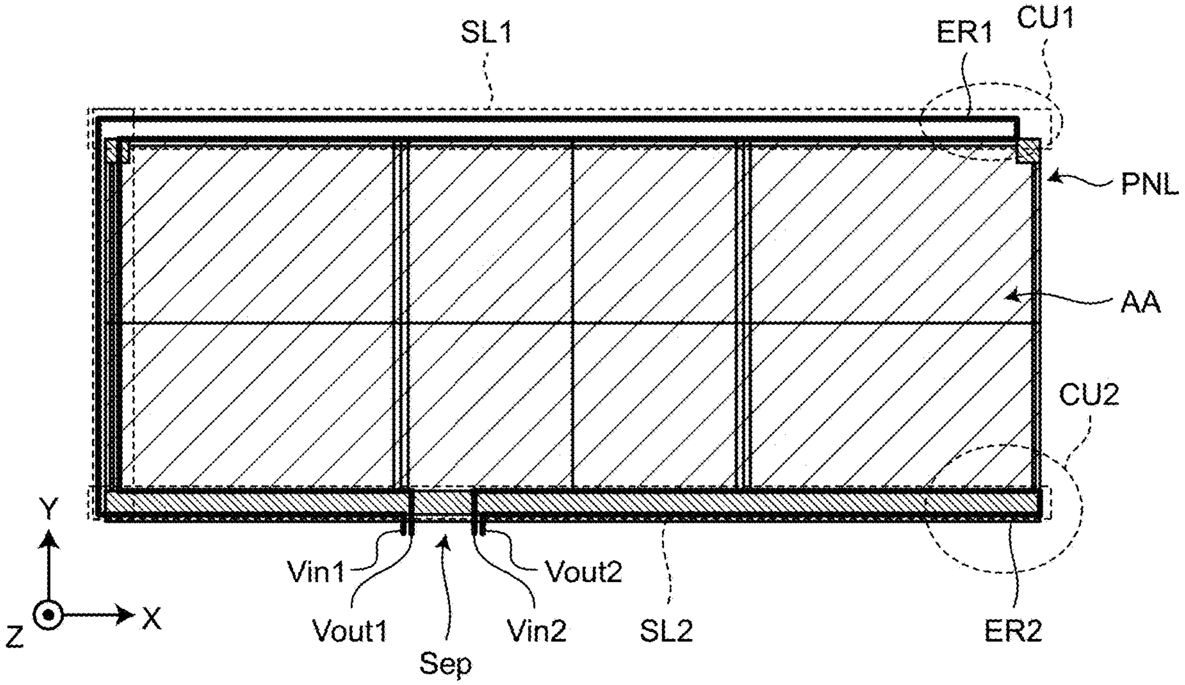
FIG. 16 is a diagram illustrating the positional relation between a display region and variable resistors and schematic shapes of the variable resistors.
Figure 17:
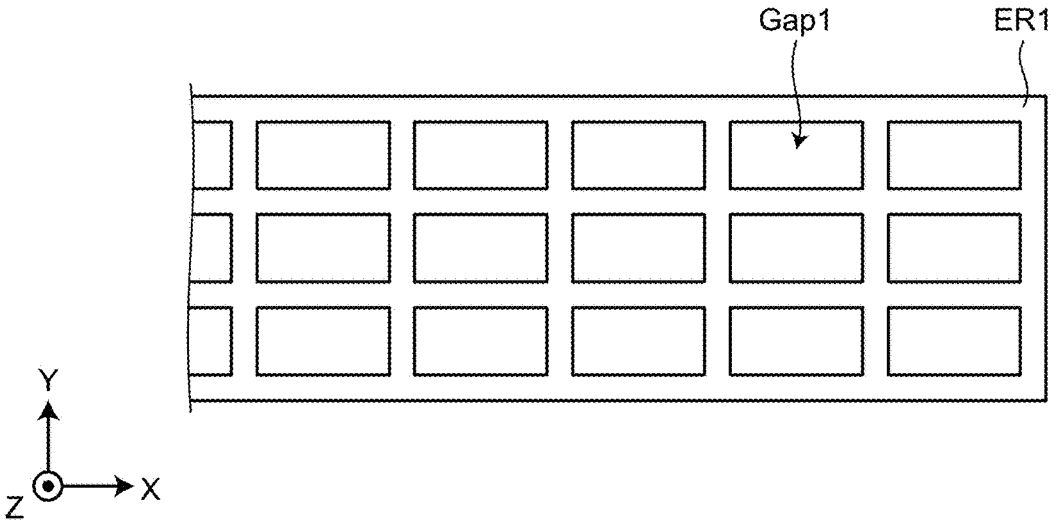
FIG. 17 is an enlarged view of a part CU1 of FIG. 16.
Figure 18:
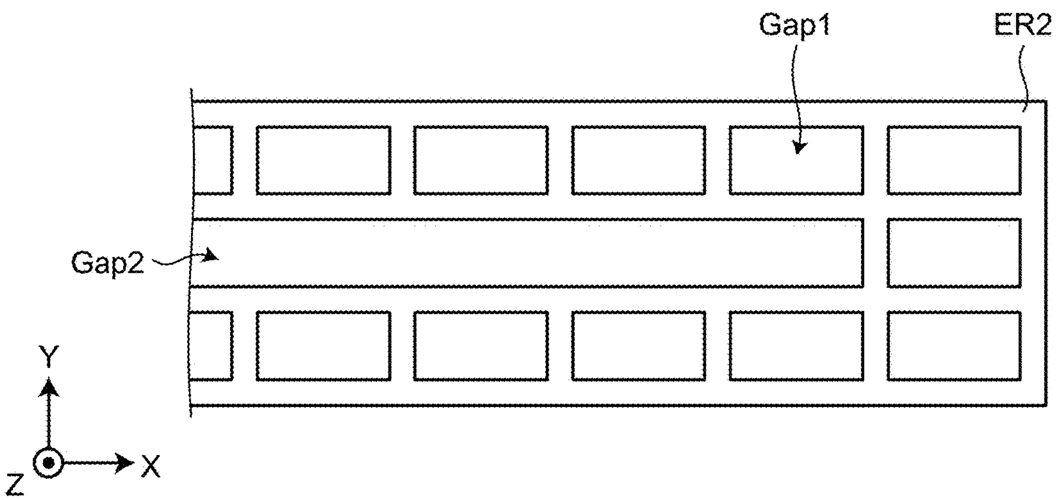
FIG. 18 is an enlarged view of a part CU2 of FIG. 16.

In FIG. 11 and FIGS. 15 and 17 to be described later, the normalized transmittance of 0.00 to 1.00 is illustrated at equal intervals in the vertical axis direction. In FIG. 12 and FIGS. 16 and 18 to be described later, the value of the normalized transmittance is 1.0 at the upper end in the vertical axis direction and decreases by 1/10 in each scale in the downward direction. The illustrated relation between the view angle and the normalized transmittance is the same between FIGS. 11 and 12 except that the manner of expression in the vertical axis direction is different therebetween. In the horizontal axis direction in FIGS. 11 and 12 and FIGS. 15 to 18 to be described later, the line of sight at an angle tilted toward the one side in the first direction X with respect to a reference (view angle of) 0°) at the line of sight when viewing the display device 1 from the front is regarded as a view angle of a positive (+) value, and the line of sight at an angle tilted toward the other side in the first direction X is regarded as a view angle of a negative (−) value.

In a case of a configuration in which the light adjuster 10 includes only the E-mode liquid crystal panel, the normalized transmittance is extremely close to 0 at the view angle of −30° but is 0.1 or larger at view angles on the positive (+) side of −20° and on the negative (−) side of −40°. In this manner, with the E-mode liquid crystal panel only, there remains the possibility that the image DSP unintentionally can be viewed when obliquely viewed if the view angle is even slightly deviated from −30°.

In a case of a configuration in which the light adjuster 10 includes only the O-mode liquid crystal panel, the normalized transmittance is approximately 0.1 or larger up to −25° approximately even when viewed from the other side in the first direction X. In this manner, with the O-mode liquid crystal panel only, prevention of viewing from the other side in the first direction X is potentially insufficient.

However, in a case of a configuration in which the light adjuster 10 includes both the E-mode and O-mode liquid crystal panels as in the embodiment, the normalized transmittance is significantly smaller than 0.1 when the view angle is on the negative side of −20°. Unlike the case of the E-mode liquid crystal panel only, the normalized transmittance is not 0.1 or larger even when the view angle is on the negative (−) side of −40°. In this manner, according to the embodiment, since the light adjuster 10 includes both the E-mode and O-mode liquid crystal panels, it is possible to more reliably prevent viewing of the image DSP on the display device 1 in the second state from the other side in the first direction X.

In the display device 1, the specific configuration of the display panel 30 that can be combined with the light adjuster 10 of the embodiment is not limited to the above-described liquid crystal panel of the IPS type. The display panel 30 may be a liquid crystal panel of another type as long as it is what is called a transmissive liquid crystal panel and includes a plurality of pixels in each of which the transmission degree of light is individually controllable in accordance with image data input from the outside. The following describes, with reference to FIG. 13, the configuration of pixels provided in a liquid crystal panel of the IPS type, which is employable as the display panel 30 of the embodiment.

Figure 13:
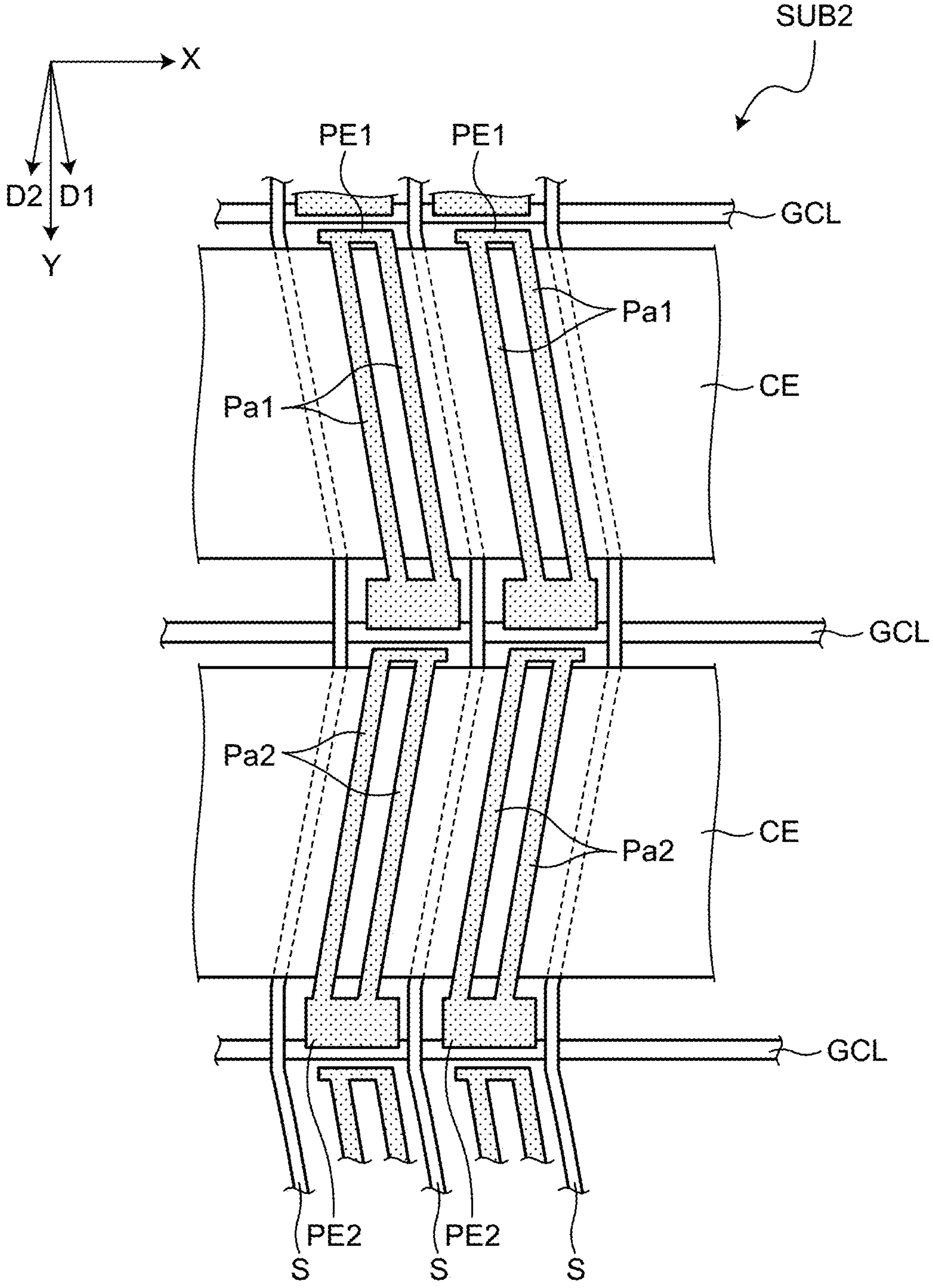
FIG. 13 is a plan view illustrating an example of a pixel arrangement in a display panel.

FIG. 13 is a plan view illustrating an example of a pixel arrangement in the display panel 30. FIG. 13 illustrates overlapping of pixel electrodes PE1 and PE2 and the common electrode CE when viewed from the fifth polarization layer 42 side. Each pixel electrode P described above with reference to FIG. 2 is the pixel electrode PE1 or PE2 in FIG. 13. The pixel substrate 31 includes a plurality of scanning lines GCL and a plurality of signal lines S. The scanning lines GCL each extend in the first direction X and are arranged at intervals in the second direction Y. The signal lines S each extend substantially in the second direction Y and are arranged at intervals in the first direction X.

A plurality of pixel electrodes PE1 are arranged in the first direction X. Each pixel electrode PE1 includes strip electrodes Pa1 overlap the common electrode CE. The strip electrodes Pa1 extend in a direction D1 different from the first direction X and the second direction Y. A plurality of pixel electrodes PE2 are arranged in the first direction X. Each pixel electrode PE2 includes strip electrodes Pa2 overlap the common electrode CE. The strip electrodes Pa2 extend in a direction D2 different from the direction D1. The numbers of strip electrodes Pa1 and Pa2 may be one or may be equal to or larger than three.

The following describes a temperature detection function of the display device 1 with reference to FIGS. 14 to 20.

Figure 14:
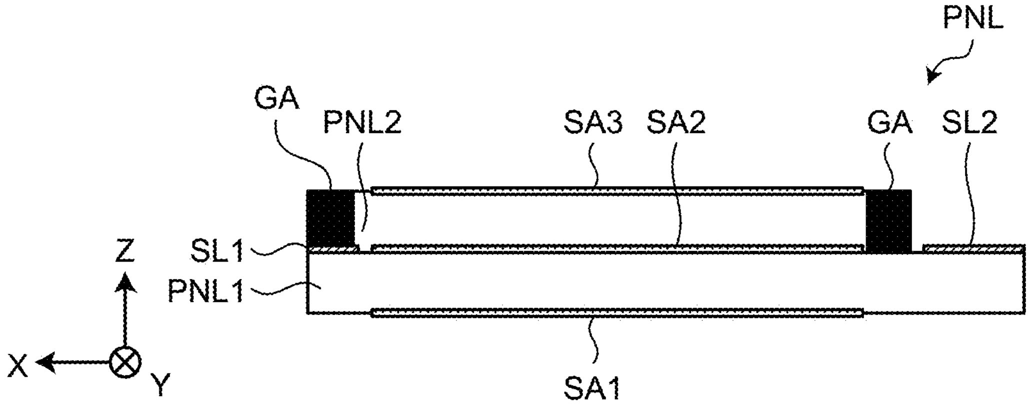
FIG. 14 is a schematic view illustrating an example of the configuration of a temperature detection panel.

FIGS. 14 and 15 are schematic views illustrating an example of the configuration of a temperature detection panel PNL. The temperature detection panel PNL is the liquid crystal panel 20 or the display panel 30. In a case where the temperature detection panel PNL is the liquid crystal panel 20, a first panel PNL1 is the first substrate 21 and a second panel PNL2 is the second substrate 22. In a case where the temperature detection panel PNL is the display panel 30, the first panel PNL1 is the pixel substrate 31 and the second panel PNL2 is the counter substrate 32.

A frame region GA is a frame region that transmits substantially no light and is, for example, a region in which the seals 25 and 36 described above with reference to FIG. 2 are provided. The frame region GA in FIG. 15 is intentionally illustrated narrower to clearly illustrate a first frame part SL1, a second frame part SL2, a third frame part SLA3, and a fourth frame part SLA4 that overlap the frame region GA when viewed in the third direction Z, and the illustration does not reflect the actual width.

Figure 19:
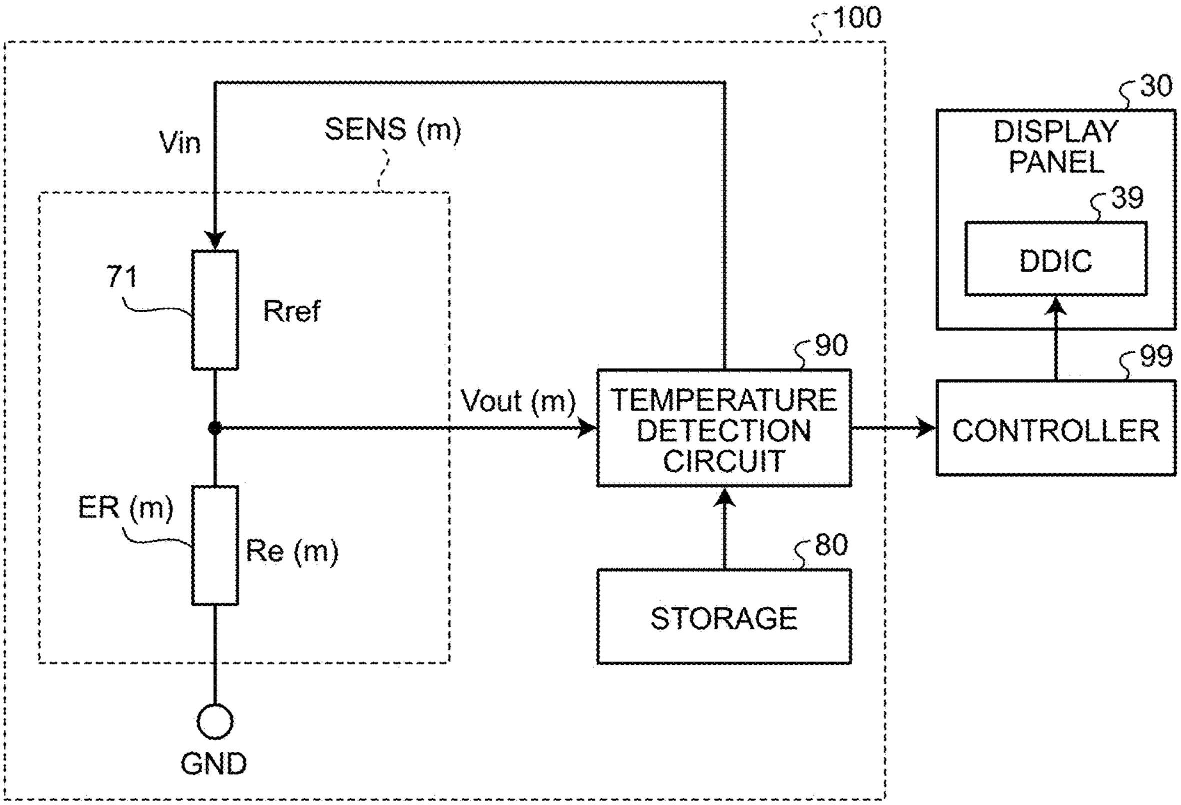
FIG. 19 is a schematic block diagram illustrating the relation between a circuit configuration of a temperature sensor, a circuit configuration of a temperature detector including the temperature sensor, and control based on an output from the temperature detector.

The temperature detection panel PNL includes a temperature sensor part SENS (refer to FIG. 19). The temperature sensor part SENS is provided at one or more of the first frame part SL1, the second frame part SL2, a first display region inside SA1, a second display region inside SA2, and a third display region inside SA3 illustrated in FIG. 14, and the third frame part SLA3 and the fourth frame part SLA4 illustrated in FIG. 15.

A display region inside SA illustrated in FIG. 15 illustrates an example when the first display region inside SA1, the second display region inside SA2, and the third display region inside SA3 are viewed in the third direction Z. As illustrated in FIG. 15, the display region inside SA is positioned in the display region AA. As illustrated in FIG. 14, the first display region inside SA1 is on one surface side of the first panel PNL1. The second display region inside SA2 is on the other surface side of the first panel PNL1. The third display region inside SA3 is on the other surface side of the second panel PNL2.

As illustrated in FIG. 15, the first frame part SL1, the second frame part SL2, the third frame part SLA3, and the fourth frame part SLA4 are each disposed along one of four sides forming outer edges of the rectangular shape of the display region AA at a viewpoint of viewing an X-Y plane from the front, and are disposed along different sides, respectively. The first frame part SL1, the second frame part SL2, the third frame part SLA3, and the fourth frame part SLA4 form a rectangular frame inside which the display region AA is accommodated. As illustrated in FIG. 14, components (for example, variable resistors ER1 and ER2 to be described later) of the temperature sensor part SENS provided at the first frame part SL1 and the second frame part SL2 are formed on the other surface side of the first panel PNL1. Although not illustrated in FIG. 14, components of the temperature sensor part SENS provided at the third frame part SLA3 and the fourth frame part SLA4 are formed on the same surface as the first frame part SL1 and the second frame part SL2.

The first panel PNL1 has end parts facing each other in the second direction Y. One of the end parts is a first end part coupled to wiring (for example, an flexible printed circuit (FPC)) through which the temperature detection panel PNL is coupled to an external circuit or information processing device. The other of the end parts is a second end part provided opposite the first end part. The second frame part SL2 is positioned on the first end part side, and the first frame part SL1 is positioned on the second part side.

The temperature sensor part SENS will be more specifically described below. The following first describes, with reference to FIGS. 16 to 18, an exemplary configuration in which variable resistors included in the temperature sensor part SENS are provided at the first frame part SL1, the fourth frame part SLA4, and the second frame part SL2.

FIG. 16 is a diagram illustrating the positional relation between the display region AA and the variable resistors ER1 and ER2 and schematic shapes of the variable resistors ER1 and ER2. The variable resistors ER1 and ER2 are components of a temperature detector provided at the first frame part SL1, the fourth frame part SLA4, and the second frame part SL2. Specifically, the variable resistors ER1 and ER2 are conductors separated from each other by a separation part Sep in the second frame part SL2. In other words, the variable resistors ER1 and ER2 are electrically independent from each other. The separation part Sep is a region of the second frame part SL2 where none of the variable resistors ER1 and ER2 are extended.

The variable resistor ER1 is a structural body as a continuation of the following conductors: a conductor extending in the first direction X at the first frame part SL1, a conductor extending in the second direction Y at the fourth frame part SLA4, and a conductor extending in the first direction X on the one side of the separation part Sep in the second frame part SL2 in the first direction X. The variable resistor ER2 is a conductor extending in the first direction X on the other side of the separation part Sep in the second frame part SL2 in the first direction X. The conductors forming the variable resistors ER1 and ER2 are, for example, copper but not limited thereto and may be any other conductor such as metal, alloy, or compound.

FIG. 17 is an enlarged view of a part CU1 of FIG. 16. As illustrated in FIG. 17, the variable resistor ER1 is a conductor in a lattice shape. Each lattice hole Gap1 of the variable resistor ER1 illustrated in FIG. 17 has a rectangular shape with its longitudinal direction in the first direction X but is not limited thereto and may have another shape.

FIG. 18 is an enlarged view of a part CU2 of FIG. 16. As illustrated in FIG. 18, the variable resistor ER2 is a conductor in a ladder shape continuous around a gap Gap2. Each gap of the ladder has, for example, the same shape as each lattice hole Gap1 in FIG. 17 but may have a different shape.

As illustrated in FIG. 16, an input terminal Vin1 and an output terminal Vout1 of the variable resistor ER1 extend in the second direction Y near the separation part Sep. An input terminal Vin2 and an output terminal Vout2 of the variable resistor ER2 extend in the second direction Y near the separation part Sep.

The electric resistance value of the variable resistor ER1 depends on the temperature of the variable resistor ER1, and the electric resistance value of the variable resistor ER2 depends on the temperature of the variable resistor ER2. Thus, the temperature of the temperature detection panel PNL where the variable resistors ER1 and ER2 are provided can be detected based on the electric resistance values of the variable resistors ER1 and ER2. Hereinafter, a resistance value means an electric resistance value unless otherwise stated. The mechanism of temperature detection based on a resistance value will be described below with reference to FIG. 19.

FIG. 19 is a schematic block diagram illustrating the relation between a circuit configuration of a temperature sensor SENS(m), a circuit configuration of a temperature detector 100 including the temperature sensor SENS(m), and control based on an output from the temperature detector 100. As illustrated in FIG. 19, the temperature detector 100 includes the temperature sensor SENS(m), a storage 80, and a temperature detection circuit 90.

As illustrated in FIG. 19, the temperature sensor SENS (m) has a configuration in which a reference resistor 71 and a temperature detection resistance element ER(m) are electrically coupled in series to each other between an input potential Vin input from the temperature detection circuit 90 and a reference potential GND. The temperature sensor SENS(m) outputs an output potential Vout(m) in accordance with the volume resistivity of the temperature detection resistance element ER(m). In other words, a coupling-point potential of the temperature detection resistance element ER(m) and the reference resistor 71 is output as the output potential Vout(m) of the temperature sensor SENS(m).

In the temperature sensor SENS(m), current generated in accordance with the input potential Vin is prevented from flowing to the reference potential GND in accordance with the volume resistivity of the temperature detection resistance element ER(m), and accordingly, current toward the temperature detection circuit 90 is generated. The current toward the temperature detection circuit 90 generates the output potential Vout(m). Thus, the output potential Vout(m) is higher as the volume resistivity of the temperature detection resistance element ER(m) is higher. In other words, the output potential Vout(m) reflects an electric resistance value depending on the temperature of the temperature detection resistance element ER(m).

When Rref represents the resistance value of the reference resistor 71 and Re(m) represents the resistance value of the temperature detection resistance element ER(m), the output potential Vout(m) of the temperature sensor SENS(m) is expressed by Expression (1) below:

$$Vout\,(\mathrm{m}) = [\mathrm{Re}\,(\mathrm{m})/\{\mathrm{Re}\,(\mathrm{m}) + Rref\}] \times Vin \qquad (1)$$

In this case, temperature TPA (m) detected by the temperature sensor SENS(m) is expressed by Expression (2) below:

$$TPA\,(\mathrm{m}) = [Rref/\{(Vin/Vout\,(\mathrm{m})) - 1\}] \times a\,(\mathrm{m}) + b\,(\mathrm{m}) \qquad (2)$$

In Expression (2) above, the first coefficient a(m) and the second coefficient b(m) are characteristic values for compensating electric characteristic variance of the temperature detection resistance element ER(m) and are different for each temperature detection resistance element ER(m). Thus, when calculating the temperature of each partial temperature detection region PA detected by the temperature sensor SENS(m), the temperature detection circuit 90 needs to apply the first coefficient a(m) and the second coefficient b(m) that are different for each of the temperature detection resistance elements ER(m) of the temperature sensors SENS (m), in other words, for each of the output potentials Vout(m) output from the partial temperature detection regions PA.

The variable resistors ER1 and ER2 described above with reference to FIGS. 16 to 18 function as the temperature detection resistance elements ER(m). Thus, the first coefficient a(m) and the second coefficient b(m) are individually prepared for the variable resistors ER1 and ER2. The individual first coefficients a(m) and second coefficients b(m) are stored in the storage 80. The storage 80 is a rewritable non-transitory memory such as a flash memory.

The temperature detection circuit 90 is a circuit having a function to access the storage 80, read the first coefficients a(m) and the second coefficients b(m) corresponding to the output potentials Vout(m) output from the temperature sensors SENS(m), and calculate the temperature of each partial temperature detection region PA in a temperature detection region SA.

When the variable resistor ER1 is regarded as a temperature detection resistance element ER(m), the input potential Vin is provided to the input terminal Vin1 and the output potential Vout(m) is obtained from the output terminal Vout1. When the variable resistor ER2 is regarded as a temperature detection resistance element ER(m), the input potential Vin is provided to the input terminal Vin2 and the output potential Vout(m) is obtained from the output terminal Vout2. The temperature detection circuit 90 individually performs calculation of a temperature (first temperature) based on the resistance value of the variable resistor ER1 and calculation of a temperature (second temperature) based on the resistance value of the variable resistor ER2. The temperature detection circuit 90 may determine the temperature of the temperature detection panel PNL provided with variable resistors (for example, the variable resistors ER1 and ER2) and the temperature of the display device 1 including the temperature detection panel PNL to be the average of the first temperature and the second temperature or the higher one of the first temperature and the second temperature. In the embodiment, the temperature of the temperature detection panel PNL is regarded as the temperature of the display device 1. In a case where a plurality of the temperature detection panels PNL are provided, the average of the temperatures of the temperature detection panels PNL or the temperature of a temperature detection panel PNL at which the highest temperature is detected is regarded as the temperature of the display device 1.

The temperature of the display device 1 calculated by the temperature detection circuit 90 is output to a controller 99. The controller 99 includes a circuit configured to adjust color to be reproduced by the display panel 30 in accordance with the temperature detected by the temperature detector 100. For example, the controller 99 performs, to display driver integrated circuits (DDIC 39) of the display panel 30, outputting for applying a gamma curve corresponding to the temperature to the display panel 30. The DDIC 39 controls a potential difference between each pixel electrode P and the common electrode CE (refer to FIG. 2) of the display panel 30 in accordance with the outputting. Detailed matters related to the reproduction color adjustment by the controller 99 will be described later with reference to FIGS. 21 to 24.

Figure 20:
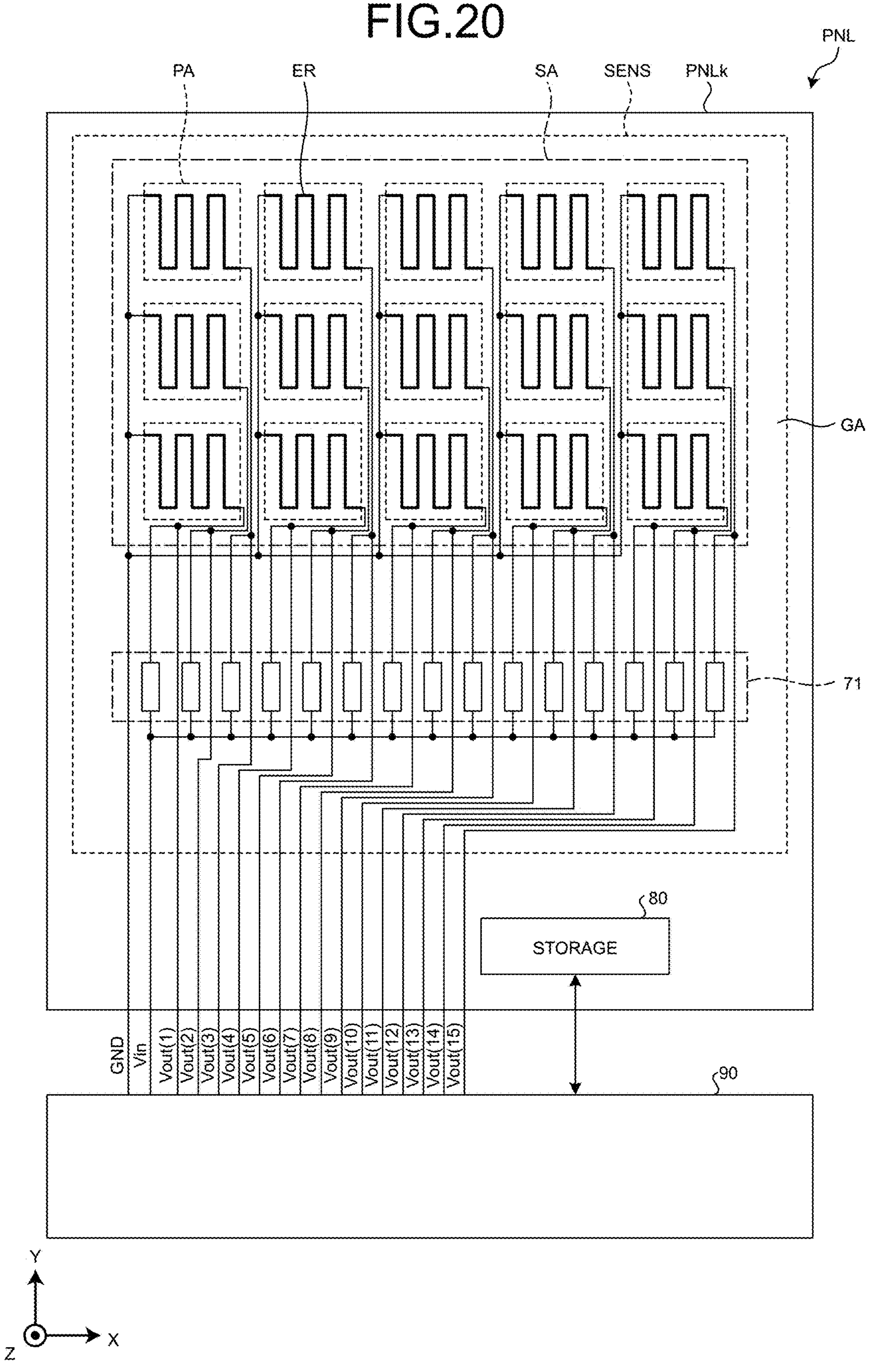
FIG. 20 is a diagram illustrating a schematic shape of a temperature detector in a case where temperature detection resistance elements are disposed inside the display region.

The following describes, with reference to FIG. 20, an exemplary configuration in which variable resistors included in the temperature sensor part SENS are provided at the first display region inside SA1, the second display region inside SA2, or the third display region inside SA3.

FIG. 20 is a diagram illustrating a schematic shape of the temperature detector in a case where the temperature detection resistance elements ER are disposed in the display region inside SA. A panel PNL in the example illustrated in FIG. 20 includes a panel PNLk, the temperature sensor part SENS, the storage 80, and the temperature detection circuit 90. The temperature sensor part SENS illustrated in FIG. 20 is a set of a plurality of the temperature sensors SENS(m) (refer to FIG. 19). The panel PNLk is the first panel PNL1 or the second panel PNL2.

The panel PNLk includes the temperature detection region SA and the frame region GA. The temperature detection region SA includes a plurality of the partial temperature detection regions PA. The partial temperature detection regions PA are regions in which a plurality of the temperature detection resistance elements ER included in the temperature sensor part SENS are provided, respectively. Although FIG. 20 exemplifies 15 partial temperature detection regions PA of 5 partial temperature detection regions PA arranged in a first direction Dx×3 partial temperature detection regions PA arranged in a second direction Dy, the number of partial temperature detection regions PA is not limited thereto. For example, a configuration in which 12 partial temperature detection regions PA of 4 partial temperature detection regions PA arranged in the first direction Dx×3 partial temperature detection regions PA arranged in the second direction Dy are formed may be employed.

The first direction Dx is an in-plane direction parallel to the panel PNLk. The second direction Dy is another in-plane direction parallel to the panel PNLk and is orthogonal to the first direction Dx. The second direction Dy may intersect the first direction Dx instead of being orthogonal thereto. A third direction Dz is a direction orthogonal to the first direction Dx and the second direction Dy and is the normal direction of the panel PNLk.

Each temperature detection resistance element ER is alloy, compound (metal compound) containing metal, or an electric resistor made of metal. Each resistance element ER may be a multilayered body in which a plurality of kinds of material corresponding to at least one of metal, alloy, and metal compound are stacked. In the embodiment, each temperature detection resistance element ER is formed of light-transmitting material such as indium tin oxide (ITO). In the example illustrated in FIG. 20, each temperature detection resistance element ER has a configuration in which a plurality of L-shaped wiring lines having long sides along the second direction Dy are coupled to each other in the first direction Dx. In this configuration, the L-shaped wiring lines are coupled to each other such that the short sides of two L-shaped wiring lines adjacent to each other in the first direction Dx are staggered in the second direction Dy, thereby achieving the form of the temperature detection resistance element ER.

A plurality of reference resistors 71 and the storage 80 are provided in the frame region GA. The temperature sensor part SENS is made up of the temperature detection resistance elements ER provided in the partial temperature detection regions PA and the reference resistors 71 provided in the frame region GA.

Any natural number of 1 to M is substituted into m, where M represents the number of partial temperature detection regions PA (M=15 in the example illustrated in FIG. 20). The temperature detection circuit 90 regards M resistance elements ER as the temperature detection resistance elements ER(m), respectively, and derives the temperature of the temperature detection panel PNL provided with the temperature detection resistance elements ER and the temperature of the display device 1 including the temperature detection panel PNL by the same mechanism as described with reference to FIG. 19.

The relation between the temperature of the temperature detection panel PNL and reproduced color in display output by the display device 1 will be described below with reference to FIGS. 21 to 24. The following first describes a case where the temperature detection panel PNL is the display panel 30, with reference to FIGS. 21 and 22.

Figure 21:
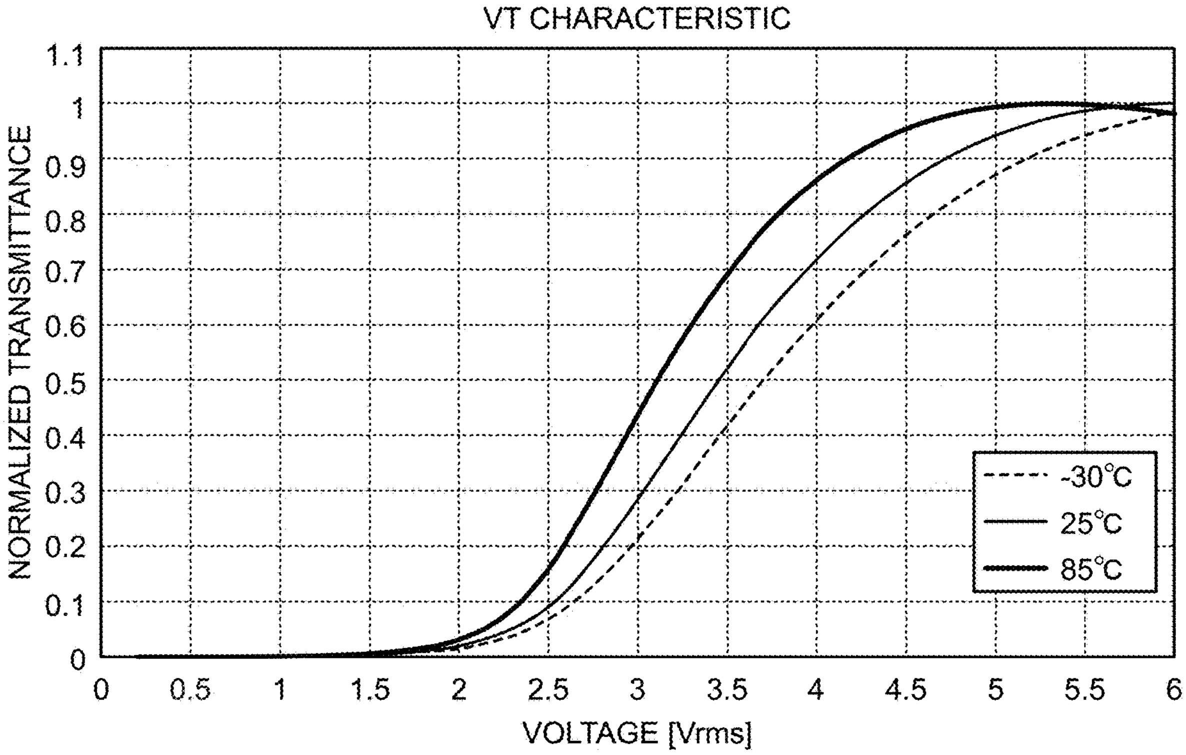
FIG. 21 is a graph illustrating the VT characteristic of a display panel.
Figure 23:
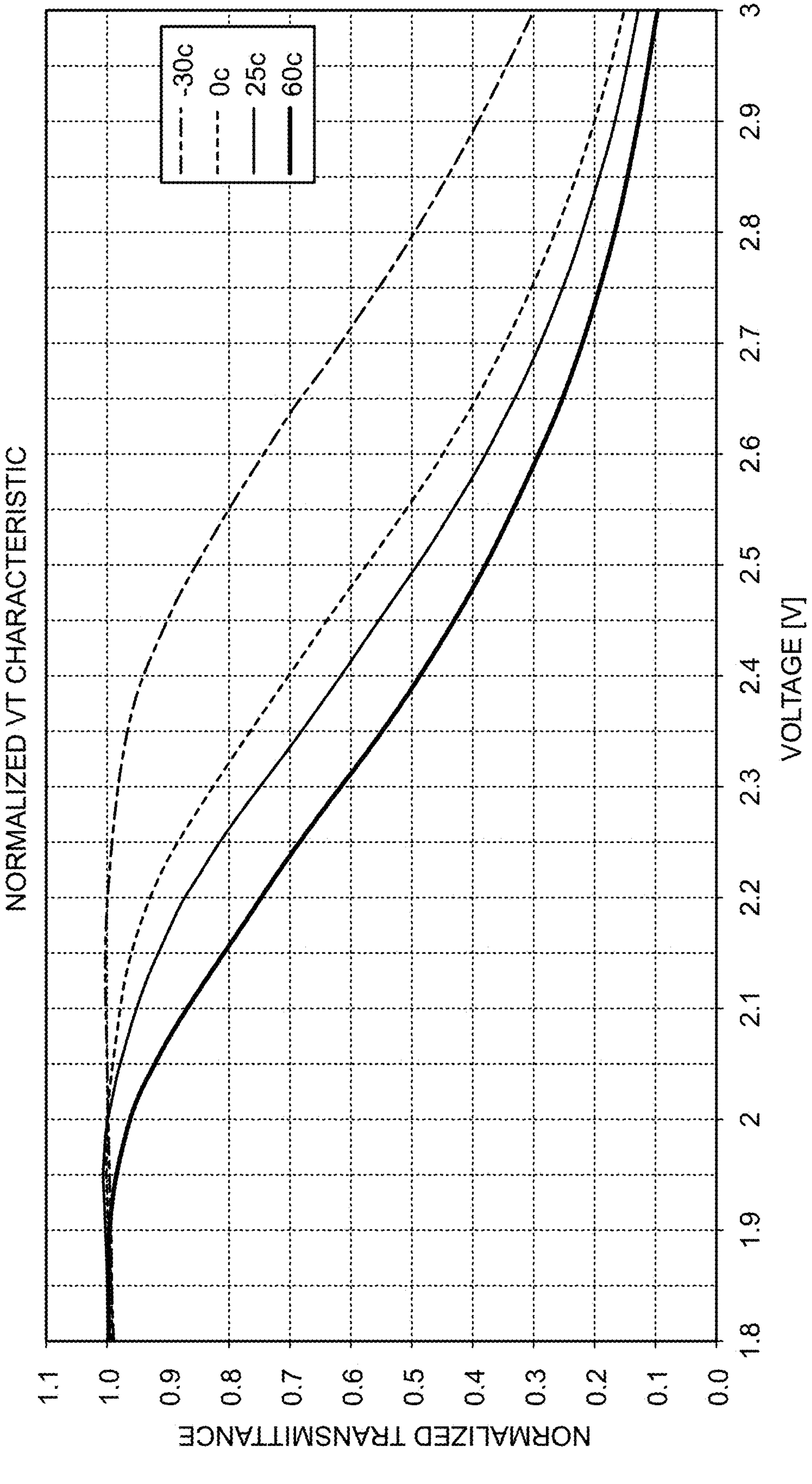
FIG. 23 is a graph illustrating the VT characteristic of the liquid crystal panel.

FIG. 21 is a graph illustrating the VT characteristic of the display panel 30. The VT characteristic is the relation between applied voltage to liquid crystal and the transmission degree of light in accordance with the orientation of each liquid crystal molecule contained in the liquid crystal provided with the applied voltage. In FIGS. 21 and 23, the transmission degree of light is illustrated as normalized transmittance. In other words, the magnitude of the normalized transmittance in accordance with applied voltage to liquid crystal depends on the VT characteristic. FIG. 21 individually illustrates cases where the temperature of the display panel 30 is −30 degrees (° C.), 25 degrees (° C.), and 80 degrees (° C.).

The display panel 30 of the embodiment is what is called a normally black transmissive liquid crystal panel. Typically, in a normally black transmissive liquid crystal panel, control of increasing voltage to be applied to liquid crystal is performed to increase the normalized transmittance. However, in a case where the temperature of the display panel 30 is −30 degrees (° C.) as illustrated in FIG. 21, the normalized transmittance is lower than 1 even when applied voltage to liquid crystal LQ of the display panel 30 exceeds 6 V. However, in a case where the temperature of the display panel 30 is 25 degrees (° C.), the normalized transmittance is 1 when applied voltage to the liquid crystal LQ of the display panel 30 is 6 V. In a case where the temperature of the display panel 30 is 80 degrees (° C.), the normalized transmittance is 1 when applied voltage to the liquid crystal LQ of the display panel 30 is 5 V to 5.5 V. In this manner, the VT characteristic of the display panel 30 changes with temperature.

Figure 22:
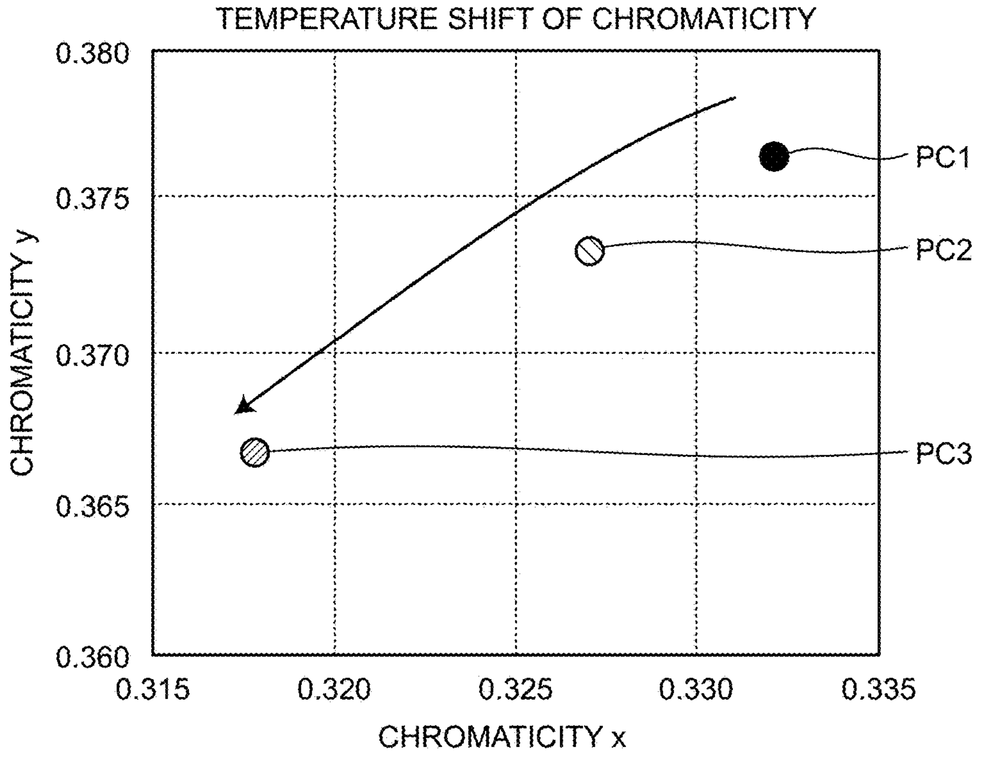
FIG. 22 is an xy chromaticity diagram illustrating the relation between the temperature of the display panel and the chromaticity of color reproduced by display output of the display panel.

FIG. 22 is an xy chromaticity diagram illustrating the relation between the temperature of the display panel 30 and the chromaticity of color reproduced by display output of the display panel 30. Blueness is stronger as the x chromaticity is lower, and redness is stronger as the x chromaticity is higher. Blueness is stronger as the y chromaticity is lower, and greenness is stronger as the y chromaticity is higher.

Chromaticity PC1, chromaticity PC2, and chromaticity PC3 in FIG. 22 correspond to cases among which applied voltage to the liquid crystal LQ is the same but the temperature of the display panel 30 is different. The temperature of the display panel 30 when the chromaticity PC3 is obtained is higher than that when the chromaticity PC1 is obtained and that when the chromaticity PC2 is obtained. The temperature of the display panel 30 when the chromaticity PC2 is obtained is higher than that when the chromaticity PC1 is obtained.

Since the VT characteristic of the display panel 30 changes with temperature, in other words, since the normalized transmittance in accordance with applied voltage changes with temperature, the chromaticity of reproduced color in display output of the display panel 30 changes with temperature as well. Specifically, as illustrated with the relation between the chromaticity PC1, the chromaticity PC2, and the chromaticity PC3 in FIG. 22, the chromaticity of reproduced color in display output of the display panel 30 is more blueish as temperature is higher.

The following describes a case where the temperature detection panel PNL is the liquid crystal panel 20 with reference to FIG. 23.

FIG. 23 is a graph illustrating the VT characteristic of the liquid crystal panel 20. FIG. 23 individually illustrates cases where the temperature of the liquid crystal panel 20 is −30 degrees (° C.), 0 degrees (° C.), 25 degrees (° C.), and 60 degrees (° C.).

The liquid crystal panel 20 of the embodiment is what is called a normally white transmissive liquid crystal panel. Typically, in a normally white transmissive liquid crystal panel, control of increasing voltage to be applied to liquid crystal is performed to decrease the normalized transmittance. As illustrated in FIG. 21, in a case where the temperature of the liquid crystal panel 20 is −30 degrees (° C.), the normalized transmittance is substantially 1 when applied voltage to the liquid crystal LM of the liquid crystal panel 20 is equal to or lower than 2.2 V. In a case where the temperature of the liquid crystal panel 20 is 0 degrees (° C.), the normalized transmittance is lower than 1 when applied voltage to the liquid crystal LM of the liquid crystal panel 20 exceeds 2 V. In a case where the temperature of the display panel 30 is 25 degrees (° C.), the normalized transmittance is lower than 1 when applied voltage to the liquid crystal LM of the display panel 30 exceeds 2 V, and the degree of decrease in the normalized transmittance in accordance with voltage increase when applied voltage exceeding 2 V is provided is more significant than in a case where the temperature of the liquid crystal panel 20 is 0 degrees (° C.). In a case where the temperature of the liquid crystal panel 20 is 80 degrees (° C.), the normalized transmittance becomes lower than 1 once applied voltage to the liquid crystal LM of the liquid crystal panel 20 becomes equal to or higher than 1.9 V. In this manner, the VT characteristic of the liquid crystal panel 20 changes with temperature.

Figure 24:
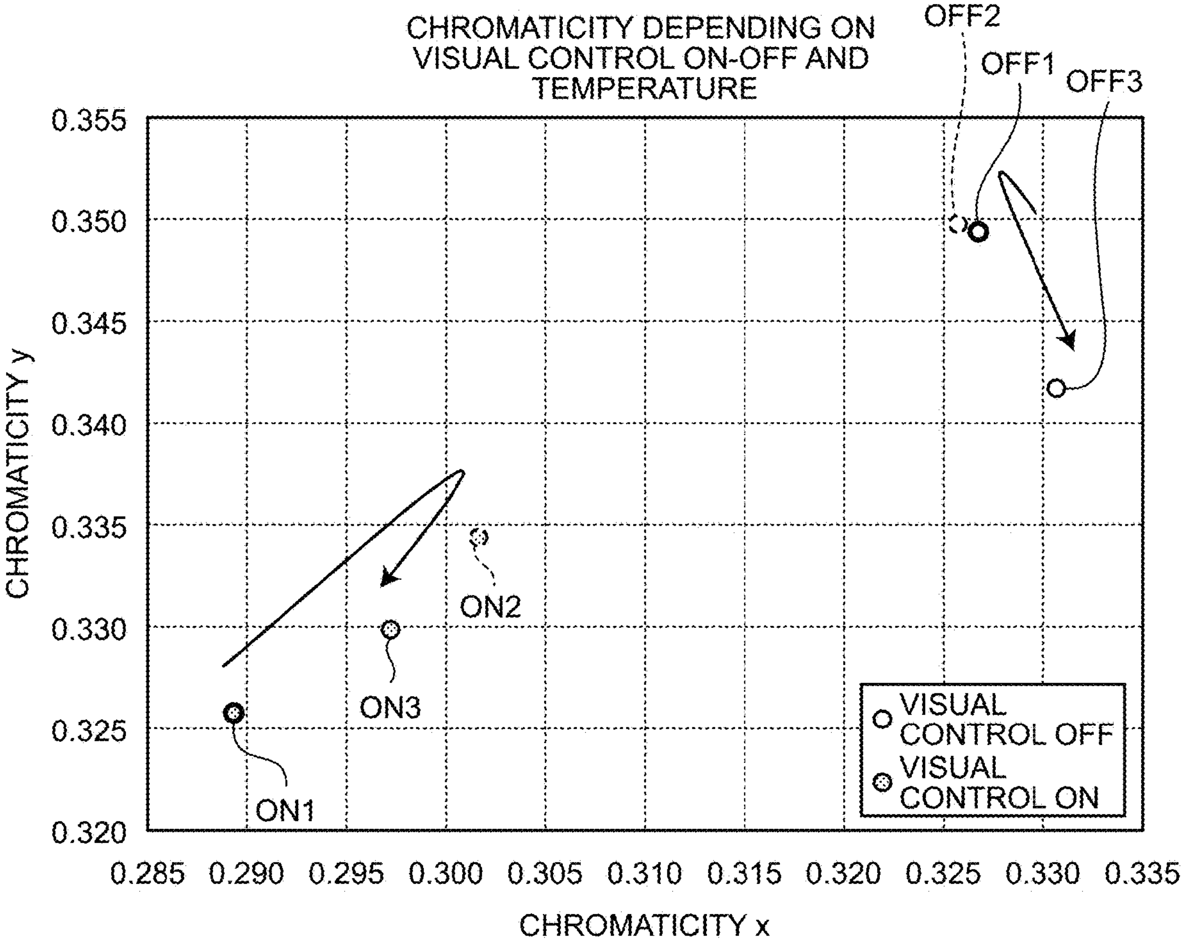
FIG. 24 is an xy chromaticity diagram illustrating the relation between the temperature of the display device and the chromaticity of color reproduced by display output of the display device.

The following describes the relation between the temperature of the display device 1 and reproduced color in display output with reference to FIG. 24.

FIG. 24 is an xy chromaticity diagram illustrating the relation between the temperature of the display device 1 and the chromaticity of color reproduced by display output of the display device 1. In FIG. 24, VISUAL CONTROL OFF corresponds to the first state. VISUAL CONTROL ON corresponds to the second state. Chromaticity OFF1, chromaticity OFF2, and chromaticity OFF3 in FIG. 24 correspond to cases among which conditions related to applied voltage to the liquid crystals LQ and LM are the same but the temperature of the display device 1 in the first state is different. The temperature of the display device 1 when the chromaticity OFF3 is obtained is higher than that when the chromaticity OFF1 is obtained and that when the chromaticity OFF2 is obtained. The temperature of the display device 1 when the chromaticity OFF2 is obtained is higher than that when the chromaticity OFF1 is obtained. Chromaticity ON1, chromaticity ON2, and chromaticity ON3 correspond to cases among which conditions related to applied voltage to the liquid crystals LO and LM are the same but the temperature of the display device 1 in the second state is different. The temperature of the display device 1 when the chromaticity ON3 is obtained is higher than that when the chromaticity ON1 is obtained and that when the chromaticity ON2 is obtained. The temperature of the display device 1 when the chromaticity ON2 is obtained is higher than that when the chromaticity ON1 is obtained. The temperature of the display device 1 is equal between the case where the chromaticity OFF1 is obtained and the case where the chromaticity ON1 is obtained. The temperature of the display device 1 when the chromaticity OFF2 is obtained is equal to that when the chromaticity ON2 is obtained. The temperature of the display device 1 when the chromaticity OFF3 is obtained is equal to that when the chromaticity ON3 is obtained.

Display output from the display device 1 is performed with light originating from light from the light source 60 and passing through the liquid crystal panel 20 and the display panel 30. Accordingly, display output of the display device 1 is affected by both the relation between the temperature and VT characteristic of the liquid crystal panel 20 and the relation between the temperature and VT characteristic of the display panel 30. As described above with reference to FIGS. 1 and 2, the liquid crystal panel 20 and the display panel 30 constitute a substantially integrated device as the display device 1, and thus, the external temperature environments where the liquid crystal panel 20 and the display panel 30 are placed are substantially identical to each other, whereby the temperature of the liquid crystal panel 20 and the temperature of the display panel 30 are substantially equal to each other.

As described above with reference to FIGS. 21 and 22, when viewed with the display panel 30 only, the chromaticity of reproduced color tends to be more blueish as the temperature of the display panel 30 is higher. As described above with reference to FIG. 23, with the liquid crystal panel 20, reactiveness of decrease in the normalized transmittance in accordance with increase in applied voltage to the liquid crystal LM tends to be more significant as the temperature is higher. Display output of the display device 1 reflects such tendencies of both the display panel 30 and the liquid crystal panel 20.

Specifically, as illustrated in FIG. 24, in VISUAL CONTROL OFF, in other words, in the first state, the positional relation between the chromaticity OFF1, the chromaticity OFF2, and the chromaticity OFF3 indicates a tendency that redness decreases and greenness increases while the temperature increases up to a predetermined temperature (temperature in a case where the chromaticity OFF2 is obtained), but indicates a tendency that redness increases and greenness decreases after the temperature exceeds the predetermined temperature. In VISUAL CONTROL ON, in other words, in the second state, the positional relation between the chromaticity ON1, the chromaticity ON2, and the chromaticity ON3 indicates a tendency that redness and greenness increase while the temperature increases up to a predetermined temperature (temperature in a case where the chromaticity ON2 is obtained), but indicates a tendency that redness and greenness decrease after the temperature exceeds the predetermined temperature.

As described above with reference to FIGS. 21 to 24, the chromaticity of reproduced color in display output of the display device 1 is affected by the temperature of the display device 1. Thus, by adjusting reproduction color of the display panel 30 in accordance with the temperature, influence of the temperature on the chromaticity of reproduced color can be prevented from being visually recognized in effect.

Specifically, with consideration on the relation between the temperature and chromaticity of the display device 1 described above with reference to FIG. 24, a gamma curve for each temperature of the display device 1 is prepared in advance, and a gamma curve corresponding to the temperature of the temperature detection panel PNL detected by the temperature detector is applied to the display panel 30. Thus, the chromaticity of reproduced color can be made substantially uniform irrespective of the temperature. Based on the description with reference to FIG. 24, in the first state, a gamma curve with which redness is stronger and greenness is weaker is applied at low temperatures, and a gamma curve with which redness is weaker and greenness is stronger is applied at high temperatures, with respect to a chromaticity at a temperature in a case where the chromaticity OFF2 is obtained. In the second state, a gamma curve with which redness and greenness are weaker is applied at low temperatures, and a gamma curve with which redness and greenness are stronger is applied at high temperatures, with respect to a chromaticity at a temperature in a case where the chromaticity ON2 is obtained.

A gamma curve in the first state and a gamma curve in the second state are prepared for each temperature to eliminate the chromaticity difference between the first and second states, which is described above with reference to FIG. 24, and a gamma curve in accordance with the temperature of the temperature detection panel PNL, which is detected by the temperature detector and the operation state (the first state or the second state) of the display device 1, is applied to the display panel 30. With this configuration, the chromaticity of reproduced color can be made substantially uniform irrespective of the temperature and the operation state of the display device 1.

As described above, according to the embodiment, the display device 1 includes the display panel 30 having the display region AA configured to output an image, the light source 60 configured to emit light toward one surface side of the display panel 30, the liquid crystal panel 20 interposed between the display panel 30 and the light source 60 and provided to be able to change the transmission degree of light between the display panel 30 and the light source 60, the temperature detector 100 configured to detect the temperature of at least one of the display panel 30 and the liquid crystal panel 20, and the controller 99 configured to adjust color to be reproduced by the display panel 30 in accordance with the temperature detected by the temperature detector 100.

This configuration can allow the color reproduced by the display panel 30 to be adjusted according to the temperature detected by the temperature detector 100. Thus, change of display output due to temperature change can be reduced by adjusting the reproduction color so that substantially equivalent reproduction color is obtained irrespective of temperature.

The controller 99 applies a gamma curve in accordance with the temperature of the display device 1 to the display panel 30, whereby the reproduction color can be adjusted so that substantially equivalent reproduction color is more reliably obtained irrespective of the temperature. Thus, change of display output due to temperature change can be more reliably reduced.

The temperature detector 100 includes a variable resistor (for example, the temperature detection resistance element ER illustrated in FIG. 20 or the variable resistor ER1 or ER2 illustrated in FIG. 19) having an electric resistance value depending on temperature and detects the temperature based on the electric resistance value of the variable resistor, whereby the temperature can be detected with a simple mechanism.

Providing the variable resistor ER1 and/or ER2 (refer to FIG. 19) functioning as the variable resistor in the frame region GA surrounding the display region AA provided at the panel to allow transmission of the light from the light source 60 (refer to FIGS. 15 and 16), eliminates the need to consider direct influence of a component as the variable resistor on display output, thereby improving the freedom of selecting the material of the variable resistor. Thus, it is easier to employ, for the variable resistor, a material with higher temperature response, which is more suitable for temperature calculation based on the correspondence relation between temperature and an electric resistance value. Accordingly, it is easier to improve the accuracy of temperature detection.

The temperature detection resistance element ER(refer to FIG. 20), which functions as the variable resistor, has a light-transmitting property and is provided in the display region AA, whereby the temperature of the display region AA as a part that more strongly contributes to display output in the display device 1 can be detected. Thus, it is possible to perform reproduction color adjustment in accordance with the temperature of the display region AA, thereby more reliably reducing change of display output due to temperature change.

One (for example, the first liquid crystal panel 20A) of two of the liquid crystal panels 20 is provided as an E-mode liquid crystal panel, and the other (for example, the second liquid crystal panel 20B) is provided as an O-mode liquid crystal panel. With this configuration, it is possible to achieve image display output utilizing both the advantage of the E-mode liquid crystal panel and the advantage of the O-mode liquid crystal panel. The advantage of the E-mode liquid crystal panel is steep decline in the transmittance of light for the line of light at a specific angle (for example, at or near the view angle of)−30°. The advantage of the O-mode liquid crystal panel is stable decline in the transmittance of light in a broader range (for example, on the negative (−) side of the view angle of)−30°. Any of the E-mode and O-mode liquid crystal panels can transmit light with which the image can be sufficiently viewed in a view angle range except for a view angle range in which the transmittance of light decreases significantly. In this manner, according to the embodiment, it is possible to simultaneously establish the view angle range in which the image can be viewed and the view angle range in which the image cannot be viewed, and more reliably ensure a wider view angle range in which the image cannot be viewed.

The liquid crystal panel 20 in operation causes the transmission degree of light tilted toward one side in the longitudinal direction of the display panel (display panel 30) having a rectangular shape (one side in the first direction X) with respect to a facing direction (the third direction Z) and the transmission degree of light tilted toward the other side in the longitudinal direction (the other side in the first direction X) to be different from each other, and the facing direction is a direction in which the display panel and the light source (light source 60) face each other. Accordingly, it is possible to simultaneously establish the view angle range in which the image can be viewed and the view angle range in which the image cannot be viewed.

The positional relation between the E-mode liquid crystal panel and the O-mode liquid crystal panel between the display panel (display panel 30) and the light source (light source 60) may be the inverse of that of the embodiment. In this case, the relation between the transmission axis direction and the absorption axis direction of each of the first polarization layer 11, the second polarization layer 12, and the third polarization layer 13 may be inverted. The slow axis directions V02 and V08 of the retardation generation layers 51 and 52 may be changed so that the slow axis directions are line symmetric with respect to the second direction Y.

In the embodiment, the light adjuster 10 includes the two liquid crystal panels 20, but the number of liquid crystal panels 20 is not limited to two but may be one or may be equal to or larger than three. In a case where a configuration in which the number of liquid crystal panels 20 is different from that in the embodiment is employed, it is possible to form the transmission path LV of light as in the embodiment by adding or changing optical members such as a polarization layer and a retardation generation layer as appropriate in accordance with the angle of polarization.

It should be understood that the present disclosure provides any other effects achieved by aspects described above in the present embodiment, such as effects that are clear from the description of the present specification or effects that could be thought of by the skilled person in the art as appropriate.

What is claimed is:

1. A display device comprising:

a display panel having a display region configured to output an image;

a light source configured to emit light toward one surface side of the display panel;

a liquid crystal panel interposed between the display panel and the light source and provided to be able to change a transmission degree of light between the display panel and the light source;

a temperature detector configured to detect temperature of at least one of the display panel and the liquid crystal panel; and a controller configured to adjust color to be reproduced by the display panel in accordance with the temperature detected by the temperature detector, wherein a state of the liquid crystal panel is not in operation is a first state, a state of the liquid crystal panel is in operation is a second state, the liquid crystal panel allows a difference between:

a transmission degree of light along a line tilted toward one side in a longitudinal direction of a rectangular shape of the display panel, with respect to a direction that the display panel and the light source face; and a transmission degree of light along a line tilted toward the other side in the longitudinal direction of the rectangular shape, with respect to the direction, to be greater in the second state than the difference in the first state, in the first state: a gamma curve with which redness is stronger and greenness is weaker is applied at low temperatures, and a gamma curve with which redness is weaker and greenness is stronger is applied at high temperatures, and in the second state: a gamma curve with which redness and greenness are weaker is applied at low temperatures, and a gamma curve with which redness and greenness are stronger is applied at high temperatures.

2. The display device according to claim 1, wherein the controller applies a gamma curve in accordance with the temperature to the display panel.

3. The display device according to claim 1, wherein the temperature detector includes a variable resistor having an electric resistance value depending on temperature and configured to detect the temperature based on the electric resistance value of the variable resistor.

4. The display device according to claim 3, wherein the variable resistor is provided in a frame region surrounding a display region provided at the at least one panel to allow transmission of the light from the light source.

5. The display device according to claim 3, wherein the variable resistor has a light-transmitting property and is provided in a display region provided at the at least one panel to allow transmission of the light from the light source.

* * * * *